United States Patent
Bonne et al.

(10) Patent No.: US 7,075,629 B2
(45) Date of Patent: Jul. 11, 2006

(54) HIGH TEMPERATURE PYROMETER

(75) Inventors: Ulrich Bonne, Hopkins, MN (US); Barrett E. Cole, Bloomington, MN (US); Roland A. Wood, Bloomington, MN (US); Rudolph Dudebout, Phoenix, AZ (US); Emmanuel Nwadiogbu, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 333 days.

(21) Appl. No.: 10/436,391

(22) Filed: May 12, 2003

(65) Prior Publication Data

US 2004/0227928 A1    Nov. 18, 2004

(51) Int. Cl.
*G01J 5/48*    (2006.01)

(52) U.S. Cl. .......................................... 356/43; 356/45

(58) Field of Classification Search ............ 356/43–51; 250/339.03, 339.04, 346; 374/128, 124, 374/129
See application file for complete search history.

(56) References Cited

U.S. PATENT DOCUMENTS

| | | | | |
|---|---|---|---|---|
| 3,619,059 A | * | 11/1971 | Muller et al. .................. | 356/45 |
| 3,860,344 A | * | 1/1975 | Garfunkel ...................... | 356/51 |
| 3,904,880 A | * | 9/1975 | Benz et al. .................... | 250/343 |
| 4,233,513 A | * | 11/1980 | Elder et al. ................... | 250/343 |
| 4,410,266 A | | 10/1983 | Seider | |
| 4,470,710 A | | 9/1984 | Crane et al. | |
| 4,659,234 A | * | 4/1987 | Brouwer et al. ............. | 374/121 |
| 4,817,020 A | | 3/1989 | Chande et al. | |
| 5,165,796 A | * | 11/1992 | Gat et al. ...................... | 374/128 |
| 5,235,399 A | * | 8/1993 | Usui et al. ..................... | 356/45 |
| 5,500,530 A | * | 3/1996 | Gregoris ................. | 250/339.11 |
| 5,755,510 A | * | 5/1998 | Hernandez et al. .......... | 374/121 |
| 5,900,635 A | * | 5/1999 | Weckstrom .................. | 250/345 |
| 6,409,198 B1 | * | 6/2002 | Weimer et al. ......... | 250/339.04 |
| 6,422,745 B1 | | 7/2002 | Steglich et al. | |

FOREIGN PATENT DOCUMENTS

EP    0729023    8/1996

OTHER PUBLICATIONS

Allen, et al., "Infrared Characterization of Particulate and Pollutant Emissions from Gas Turbine Combustors," AIAA, 39th AIAA Aerospace Sciences Meeting & Exhibit, pp. 1-15, Jan. 8-11, 2001, Reno, NV.
Bonne, et al., "Combustion Controls for Alternative Fuels," ASHRAE Trans. 87-I, pp. 361-380, 1981.
Bonne, Ulrich, "Optical Investigations in the Reaction Zone of Soot-Forming Flames," PhD Thesis, University of Gottingen, Germany, 1964. (no English translation available).

(Continued)

*Primary Examiner*—Layla G. Lauchman
(74) *Attorney, Agent, or Firm*—Kris T. Fredrick

(57) ABSTRACT

A pyrometer having at least two detectors and at least two band-pass filters near each to limit the detectable wavelength band emitted by an object, and a device to exchange their filters to eliminate detector output ratio errors. The detector output ratio is then used to derive the color temperature of the object, which may have fast changes in emission intensity output.

29 Claims, 23 Drawing Sheets

OTHER PUBLICATIONS

Jenkins, et al., "A Soot Temperature Diagnostic Combining Flame Emission and Modulated Laser Absorption," AIAA, 38th Aerospace Sciences Meeting & Exhibit, pp. 1-9, Jan. 10-13, 2000, Reno, NV.

Maldaque, et al., "Dual imager and its applications to active vision robot welding, surface inspection, and two-color pyrometry," Optical Engineering, vol. 28, No. 8, pp. 872-880, Aug. 1989.

Snyder, et al., "Determination of gas-temperature and velocity profiles in an argon thermal-plasma jet by laser-light scattering," The American Physical Society, vol. 47, No. 3, pp. 1996-2005, Mar. 1993.

See Bi-Cell devices at www.advancedphotonix.com, "Bi-Cell and Quadrant Photodiodes," 1 page.

See http://www.wintron.com, Wintronics Infrared Thermometers, http://wintron.com/Infrared/infrared.htm, 2 pages, Oct. 14, 2003.

Check for "Milestones," at http://www.cmst.org/cmst-Cp_reports/Apr95/CH033501.html, pp. 1-4, Oct. 10, 2003.

See work by Steve Ridder, NIST Metallurgy Division (301) 975-6175, stephen.ridder@nist.gov, "Extended Temperature Range for Calibration of Two-Color Pyrometers", and at http://ts.nist.gov/ts/htdocs/200/oct01.htm , NIST Representatives Report, Oct. 2001, pp. 5-6, Oct. 10, 2003.

See http://www.spectrogon.com/bandpass.html, Bandpass Filters, pp. 1-16, Oct. 13, 2003.

* cited by examiner

Table. Comparison of Thermal Radiators

| Radiator | $\epsilon$, Emiss'y | $d\epsilon/d\lambda$ | One Measurement | Two Measurements |
|---|---|---|---|---|
| Black Body | 1 | 0 | $T_A = T_B = T_C$ | |
| Gray Body | <1 | 0 | $T_A = T_C > T_B$ | |
| Gray Body | Unknown | 0 | $T_B$ | $T_C = T_A$ |
| Arbitrary | Unknown | Unknown | $T_B(\lambda)$ | $T_B(\lambda_1), T_B(\lambda_2)$ |

*Figure 18*

| Temp. | Factor | Data | R(4012) | R(4254) | R(4426) | ρ=R(4254)/R(4426) |
|---|---|---|---|---|---|---|
| K | - | - | ----- μW cm / (mm² sr) ----- | | | - |
| 2500 | 0.7 | 311 | 0.0051386 | 53.69212 | 51.08812 | 1.050971 |
| 2000 | 1 | 311 | 0.0058428 | 34.96156 | 33.66186 | 1.038610 |
| 1500 | 1.8 | 311 | 0.0049446 | 18.13105 | 17.76325 | 1.020706 |
| 1000 | 5.4 | 311 | 0.0017768 | 5.44090 | 5.53678 | 0.982684 |

*Figure 20*

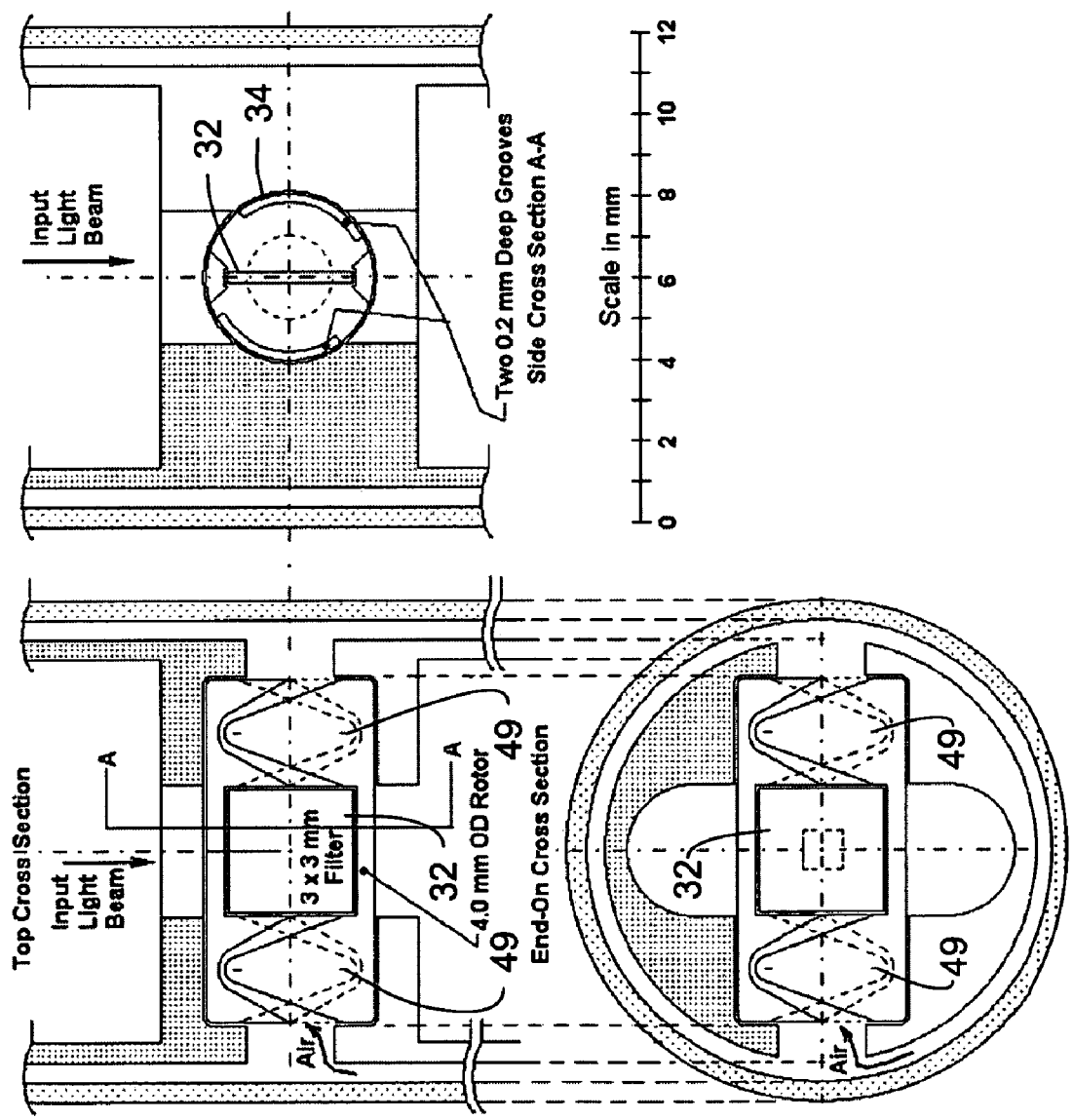

HIGH TEMPERATURE PYROMETER

BACKGROUND

The invention pertains to pyrometers and particularly to optical pyrometers. More particularly, the invention pertains to multi-detector pyrometers for measurement of nonsteady emitters.

Presently available optical pyrometers are based on either one- or two-channel measurement of the radiance of hot-surfaces or hot-gases, whereby this radiance is measured within the selected spectral band with available detectors, whether visible or infrared (IR). However, none take into account the continuous changes in detector sensitivity or filter transmission versus time and versus ambient temperature. Filter-wheel-based approaches do not achieve accurate temperature measurement because of the short measurement time and the generally sequential nature of the signal generation, which is especially detrimental with unsteady radiation sources such as turbulent flames. In addition, they are generally bulky, costly and wear out.

One application for optical pyrometers may be related to turbine engine efficiency and emissions control, which at times will be used below as an illustrative example, without limiting the applicability of the described pyrometer. The need for and the possible benefits resulting from a successful turbine combustor exit gas temperature sensor are noted. Assuming that turbine stator blades can withstand an operating temperature of 2500 degrees Fahrenheit (° F.), i.e., 1644 degrees Kelvin (° K), the non-uniformity of the combustor exit gas temperatures may force that temperature to be set to no more than about 2300° F. (1533° K, i.e., a drop of over 8 percent) in order to prevent unpredictable "hot streaks" to stay below 3300° F. (2088° K). This forced drop in average temperature and the unpredictable occurrence of hot streaks may result in both turbine efficiency losses as well as excess $NO_x$ emissions, respectively. Due to unpredictable fuel injection nozzle coking and/or plugging of air inlets, which may limit the effectiveness of even ideal, zero-variability nozzle fabrication capabilities, one solution may be to measure the exit temperature of each combustor, so that appropriate, active fuel/air ratio control can be implemented.

Examples of previous approaches and why they do not meet the needs for a small, fast, rugged, accurate and stable pyrometer that is able to operate in a harsh environment (−40° to 200° Centigrade (C.)) temperature, non-thermostatted) to measure the temperature of non-steady-state sources, are noted. Single-channel pyrometers may not be suitable because the sensitivities and null-offset of all detectors shift as a function of temperature. Measured radiance temperatures may therefore shift accordingly.

Two-channel pyrometers without a filter wheel but with two (double-decker) detectors may be elegant solutions that use one-beam light inlet from the source, followed by either double-decker silicon (Si) detectors, double-decker Si-PbS or by a beam-splitter to engage two separate detectors that are sensitive to different wavelengths. Their output ratio is a measure for source temperature and may be suitable to monitor unsteady sources. But their output temperature error might become unreasonably large as the ambient temperature deviates from calibration conditions, without temperature-dependent offset compensation. In addition, the double-decker version may be very limited in the choice of the two channel wavelengths to those transmitted by the top detector, and the beam-splitter version may not correct for individual variabilities in the sensitivity drift of the two detectors.

Two-channel-one-detector pyrometers with a filter wheel include those where the two wavelengths may be selected freely among commercially available narrow-band pass filters. However, observation of an unsteady source might require that either the filter wheel be turned faster than the source instability (which may reduce detector observation time and the signal-to-noise ratio (S/N)) or slow enough to raise the S/N (which may then increase the un-relation between the two channel signals due to unsteadiness of the source and the error in the temperature resulting from their signal ratio).

Two-channel-two-detector pyrometer with chopper consisting of two detectors with fixed filters and on/off choppers, may eliminate the time- and temperature-dependent drift of the null-offset. However, it may not compensate for the error caused by individual sensitivity drift in the detector(s) inherent in setups with fixed filter-detector pairings.

Available combustion pattern factor (CPF) sensors for each of the fuel atomizers in a gas turbine engine tended to depend on the measurement of first stator blade temperature sensing via pyrometry or deposited film thermocouples (or resistors) or special temperature-dependent phosphorescent films. Whereas this direct approach to sensing the object to be protected from overheating could be commendable, since the service life of the films has often been too short and the application method somewhat too intrusive to be of practical value. Other possible approaches based on: 1) Analyzing the sonic signature of the multi-burner combustor with an array of passive microphones may require a very large computational effort and is still in its infancy; and 2) Suction pyrometry (with or without thermocouples) may only provide limited spatial coverage.

SUMMARY

An illustrative example of the invention may be a pyrometer having one or more detectors and a filter holder next to the detectors. The holder may have several band pass filters of various band-pass wavelengths which may be moved past the detectors. The holder may have several positions which include placing filters or no filters in front of the detectors, by exchanging their positions relative to the detectors. These positions may be sequenced by a motor. The filters and radiation blocking spot may be rotated about an axis approximately parallel to the direction of the radiation being sensed by the detectors. The pyrometer may instead include one detector and a filter that may rotate about an axis approximately perpendicular to the direction of the radiation being sensed by the detector. The filter upon rotation may modulate the wavelength of the radiation between on-band and off-band, as well as between several wavelengths that define color temperature. The pyrometer may instead have detectors with one or more filters in front of them that do not physically move relative to the detector. The filters may be Fabry-Perot filters which have their optical thicknesses changed to achieve various bandwidths of band pass capabilities. A mechanism that affects the filters' thicknesses may be connected to a processor.

BRIEF DESCRIPTION OF THE DRAWING

FIG. 18 is a table comparing characteristics of thermal radiators;

FIG. 20 is table of data from an evaluation of radiance plotted in FIG. 17;

FIG. 22 reveals several views of an example of an air motor attached to the filter wheel.

DESCRIPTION

Figure 1:
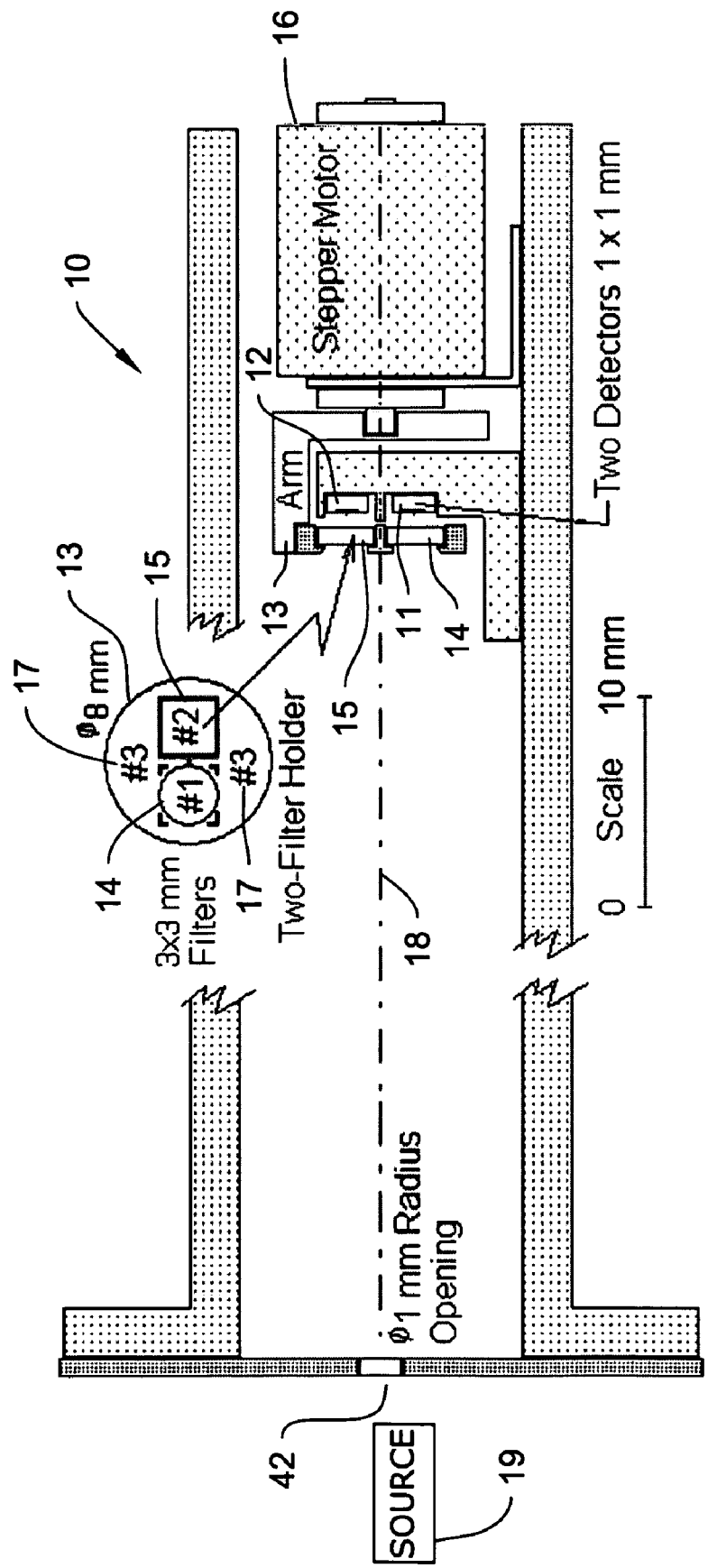
FIG. 1 shows a pyrometer having several fixed detectors and moveable filters.
Figure 2:
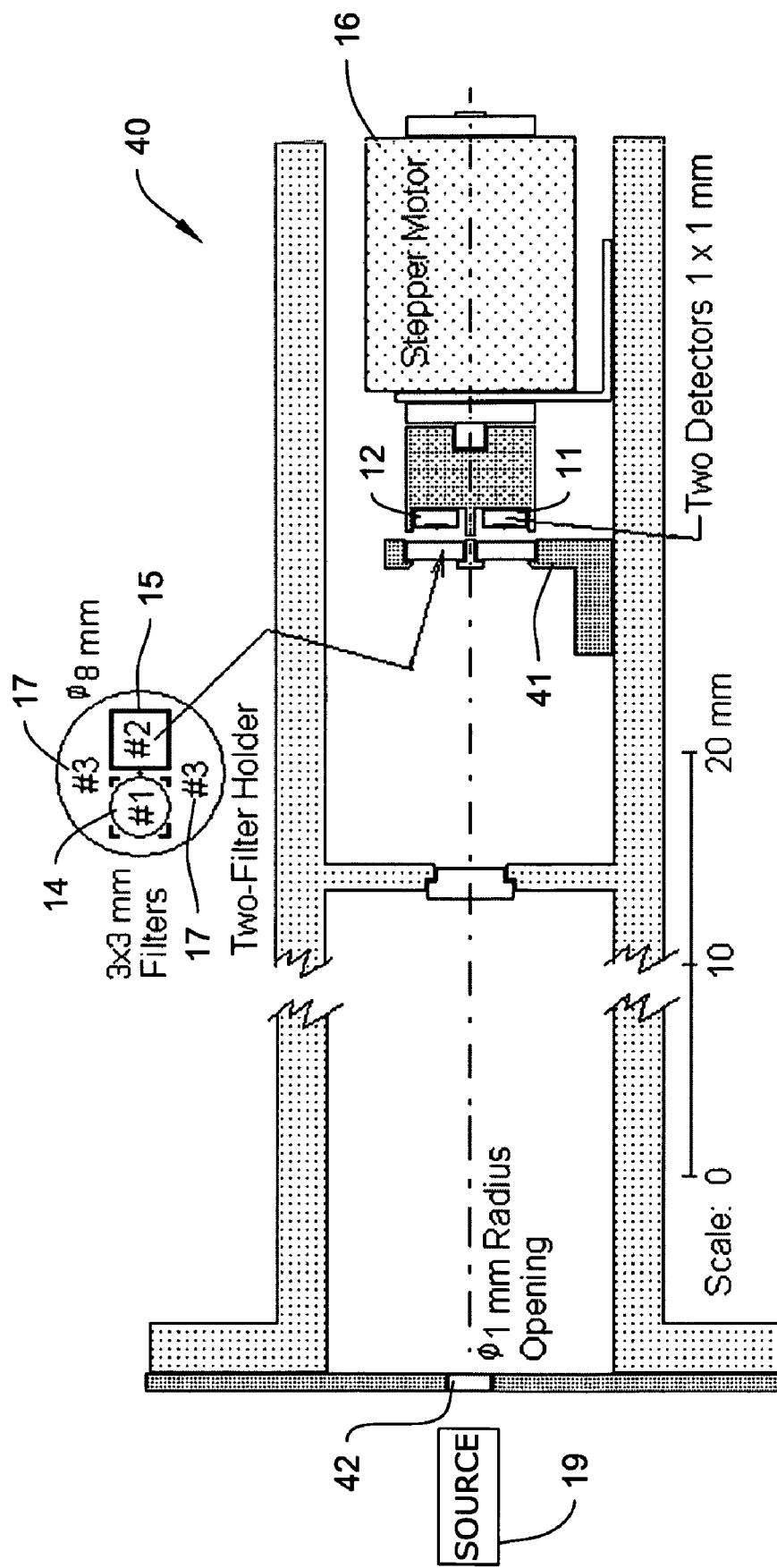
FIG. 2 shows a pyrometer having several fixed filters and moveable detectors.

An illustrative device of the invention is a pyrometer 10 having two detectors 11 and 12 and a filter holder 13 next to detectors 14 and 15 in FIG. 1. Holder 13 may support two band pass filters 14 and 15 which are moved past detectors 11 and 12. Holder 13 may have three positions which include two filters 14 and 15 in front of detectors 11 and 12, the position of the filters exchanged relative to the detectors, and no filters in front of the detectors, respectively. These positions may occur sequentially. Band pass filters 14 and 15 generally pass different spectral wavelengths. The three positions may be sequenced by a stepper motor 16. The filters and radiation blocking spot 17 may be rotated about an axis 18 approximately parallel to the direction of the radiation being sensed by the detectors through aperture 42. FIG. 2 shows a pyrometer 40 similar to pyrometer 10 except that detectors 11 and 12 move relative to stationary filters 14 and 15 for attaining the same relative positions as those of pyrometer 10.

Figure 3:
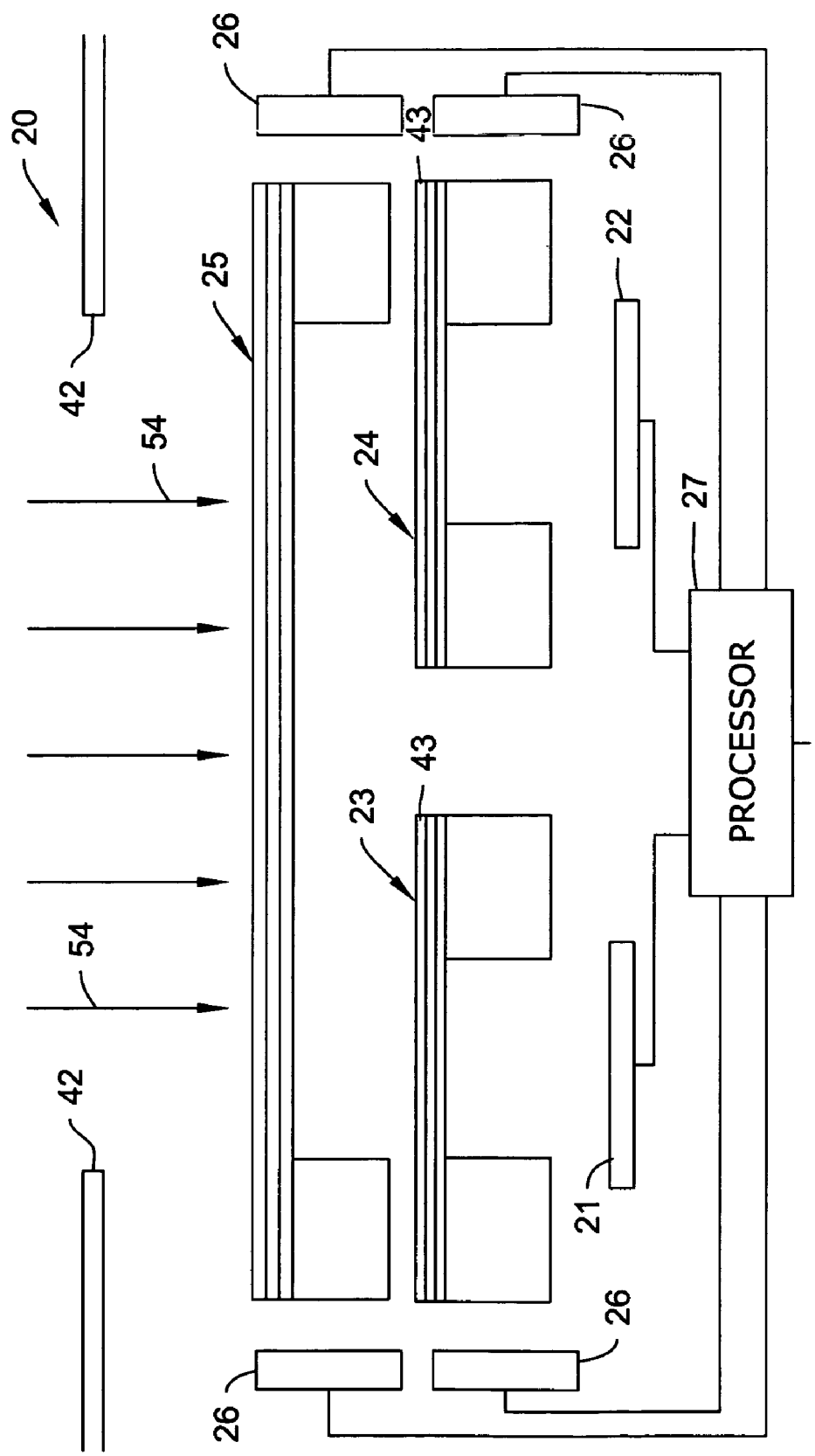
FIG. 3 shows a pyrometer having several detectors and filters that are not moveable relative to each other.

Another illustrative example is a pyrometer 20 of FIG. 3 which may likewise have two detectors 21 and 22. However, each detector 21 and 22 may have a filter 23 and 24 in front of it, respectfully, that does not physically move away from the detector. There may in some cases also be a third filter 25 in front of both detectors. The first two filters 23 and 24 individually in front of their respective detectors 21 and 22 may alternate between several band widths relative to their band pass capabilities. There may be a third filter 25 which alternates between a wide band pass that includes the bandwidths of the two individual filters 23 and 24 and a blocking band pass that blocks the bandwidths of both individual filters 23 and 24, of radiation 54 impinging pyrometer 20. All three filters 23, 24 and 25 may be Fabry-Perot filters which have their optical thicknesses changed to achieve passing variable wavelength bands capabilities. A mechanism 26 (such as a heater) that affects the filter optical band pass characteristics of the filters 23, 24 and 25 may be connected to a processor 27 for effecting changes in the filters' characteristics. The components in FIG. 3 are not drawn to scale.

Figure 5:
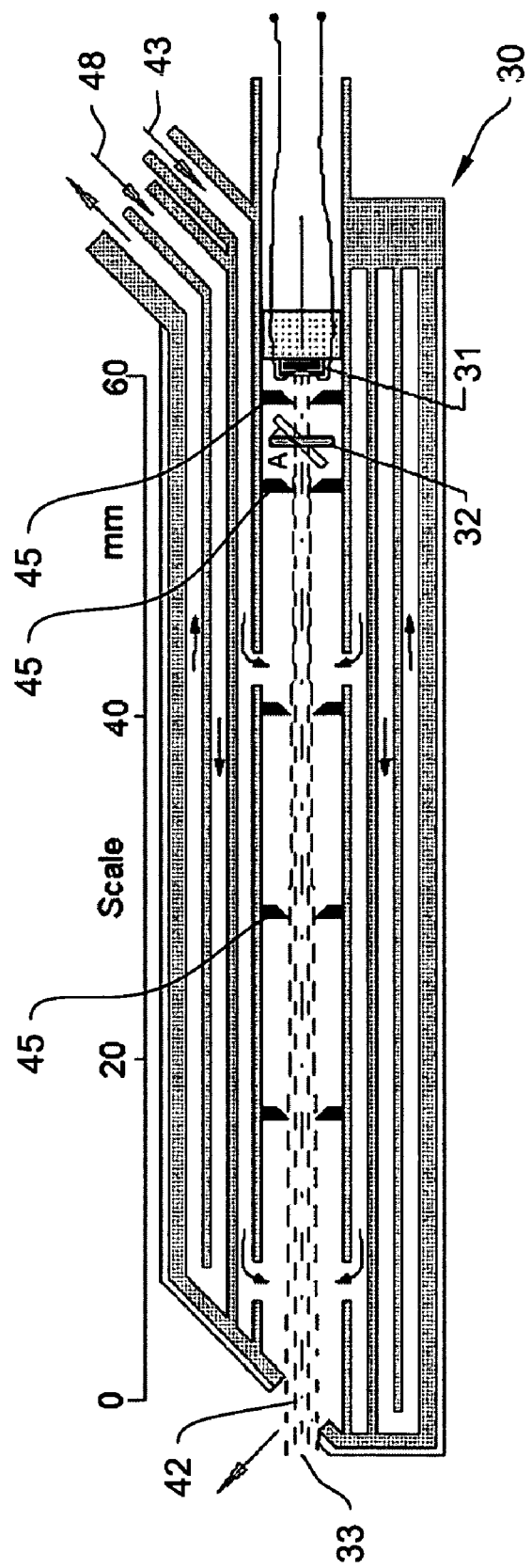
FIG. 5 shows a pyrometer having a filter that rotates on an axis perpendicular to the direction of radiation impinging the detector.

Still another illustrative example is a pyrometer 30 of FIG. 5, though not exhaustive of possible illustrative examples of the invention, may include one detector 31 and a filter 32 that rotates about an axis approximately perpendicular to path 33 of the radiation being sensed by detector 31 via aperture 42 and masks 45. Filter 32 upon rotation may modulate the wavelength of the radiation between on-band and off-band, as well as between two wavelengths that define color temperature. A mechanism such as an air motor 34 may be connected to filter 32 to rotate it. Motor 34 may alternatively be electric. Detector 31 may be structured so as to detect temperatures in a gas combustor 35 such as that of a jet engine 36 in FIG. 6a.

Three-channel pyrometer 10 of FIG. 1 may be compact, affordable and geared to sense black-body temperatures accurately, despite detector drift acerbated by operation in non-thermostatted ambients up to 200° C., individual drift (offset and sensitivity) of detectors 11 and 12, some soiling of filters 14, 15 versus service life, and unsteady sources. Pyrometer device 10 may eliminate some of the shortcomings of the above-noted approaches. It may be a three-channel approach (two "on" channels and one "off" or null channel), consisting of two freely chosen and separate narrow band-pass filters 14, 15 with transmissions $T_A$ and $T_B$, for instance, 4250 and 4425 nanometers (nm) fastened onto the plate of a chopper wheel, arm or holder 13 that passes or stops at least at three positions, the third one being a "null" or zero-transmission. The color temperature of the object (solid or gas) or source 19 at hand may then be obtained via the ratio between two, nulled sensor signals. For the above illustrative example with 4250 and 4425 nm, that ratio only varies by about 3 percent between 1500 and 2500° K, which may necessitate that each signal be measured within uncertainties of less than one part in 90,000—$(2500-1500)/\Delta T/R_S = 90,000$, where $\Delta T = \pm 10°$ K, acceptable error or uncertainty in the temperature to be measured, and $R_S = 0.03$, i.e., the signal range of about 3 percent mentioned above.

Each temperature determination may consist of three signal measurements, as follows: 1) Filter 14 with transmission $T_A$ facing detector 11 of sensitivity $S_1$ and filter 15 with transmission $T_B$ facing detector 12 of sensitivity $S_2$, leading to signals A1 and B2; 2) Filter 14 with transmission $T_A$ facing detector 12 with sensitivity $S_2$, and filter 15 with transmission $T_B$ facing detector 11 of sensitivity $S_1$, leading to signals $A_2$ and $B_1$; and 3) Null, i.e., when two detectors 11 and 12 just face a relatively cool and opaque filter wheel plate, offset or null signals $N_1$ and $N_2$ may be sensed. For the sake of brevity one may henceforth think of the signals $A_1$, $A_2$, $B_1$ and $B_2$ as nulled signals, i.e., signals from which the appropriate $N_1$ or $N_2$ values have been subtracted.

During operation, the incoming radiation intensities from the source 19, $I_A$ and $I_B$, may be proportional to the generated signals, $A_1$ and $B_2$, and $A_2$ and $B_1$ (for filter positions 1 and 2), respectively, but may be corrected for variables $T_A$, $T_B$, $S_1$ hand $S_2$. For the first two filter positions (and ignoring $N_1$ and $N_2$ for now), one may have $$I_A = A_1/(T_A \cdot S_1) \text{ and } I_B = B_2/(T_B \cdot S_2), \text{ and} \qquad (1)$$

$$I'_A = A'_2/(T_A \cdot S'_2) \text{ and } I'_B = B'_1/(T_B \cdot S'_1), \qquad (2)$$

where the primes indicate that the second set of measurements was made at a different time than those of the first set. If one were now to form separately the color-temperature-related ratio $I_A/I_B$ at either position "1" or "2", one could face an expression that contained the unknowns $S_1$ and $S_2$, i.e., not a useful proposition without an ability to quantify $S_1$ and $S_2$.

If instead one formed the ratios using the cross terms $I_A/I'_B = (A_1/B'_1) \cdot (T_A \cdot S_1)/(T_B \cdot S'_1)$, or its symmetrical twin, $I'_A/I_B = (A'_2/B_2) \cdot (T_A \cdot S'_2)/(T_B \cdot S_2)$, one might assume that the $S_1$ or $S_2$ would approximately cancel, but may do this with "time un-related" $S_1$ and $S'_1$, $A_1$ and $B'_1$ or the twin pairs $S_2'$ and $S_2$, and $A'_2$ and $B_2$, i.e., it would not be useful either.

But if one formed the square root of the product of the two, $$I^+_A/I^+_B \sim \{(I_A/I_B) \cdot (I'_A/I'_B)\}^{0.5} = \{(A_1/B_2) \cdot (A'_2/B'_1)\}^{0.5} \cdot (T_B/T_A) \cdot \{(S'_1/S_1) \cdot (S_2/S'_2)\}^{0.5}, \qquad (\text{eq. 1})$$

then one may be forming the geometric mean (indicated by "+") of two temperature sensor signal equivalents, eliminating the unknown and variables $S_1$ and $S_2$ (the S-term~1), and computing the result with "time-related" signal ratios, and one may allow enough time at each filter position to maximize S/N. One might only need to assume that during the time periods of positions 1) and 2), the relative changes in the detector sensitivities between $S_1$ and $S'_1$, and $S_2$ and $S'_2$ are the same, rather than having to assume that they have not changed at all.

Several illustrative examples of the above are discussed and shown. For all of them, the angular beam aperture may be somewhat limited by the FWHM (full-width at half maximum, $\Delta\lambda$) of the selected band pass filters, because the transmitted wavelength shifts with the angle of incidence. In FIG. 1, the filters may move between rotational positions of 0, 90, 180, 90 and 0°, corresponding to above positions 1), 3), 2), 3) and 1), for instance, of filters 14, 17, 15, 17 and 14 positioned in front of detector 11, respectively. In FIG. 2, detectors 11 and 12 may move between rotational positions of 0, 90, 180, 90 and 0°; for instance, detector 11 may move behind filters 14, 17, 15, 17 and 14, respectfully. Filter holder 41 would not move. In FIG. 3, neither detector nor filter move. Rather, two similar Fabry-Perot (FP) filters 23 and 24 may change their transmission in front of one blocking filter 25 and in front of each of the two detectors 21 and 22 to correspond to above positions 1), 3), 2), 3') (180° of "3", if possible); 2), 3) and 1). As the incidence angle, $\phi$, formed between the beam transmitted by the band-pass filter 23, 24 and normal incidence, $\phi_o=0$, its nominal center wavelength, $\lambda_o$, may shift to longer wavelengths, $\lambda_o+\delta\lambda$, according to $\delta\lambda/\lambda=1/\cos(\phi)-1$. So, if one requires that $\delta\lambda \leq \Delta\lambda/10$, e.g., for $\Delta\lambda=50$ nm at $\lambda=4325$ nm, then $\delta\lambda/\lambda \leq 50/4325$, and $\phi$ may need to be limited by the value of: $\phi \leq \arccos\{1/(\delta\lambda/\lambda+1)\} = \arctan[(1-\{1/(\delta\lambda/\lambda+1)\}^2)^{0.5}/\{1/(\delta\lambda/\lambda+1)\}]=0.048$ radians=2.75°. For a circular aperture 42 of radius r=1 millimeter (mm), this may correspond to a focal distance of no less than 20.8 mm.

Figure 4:
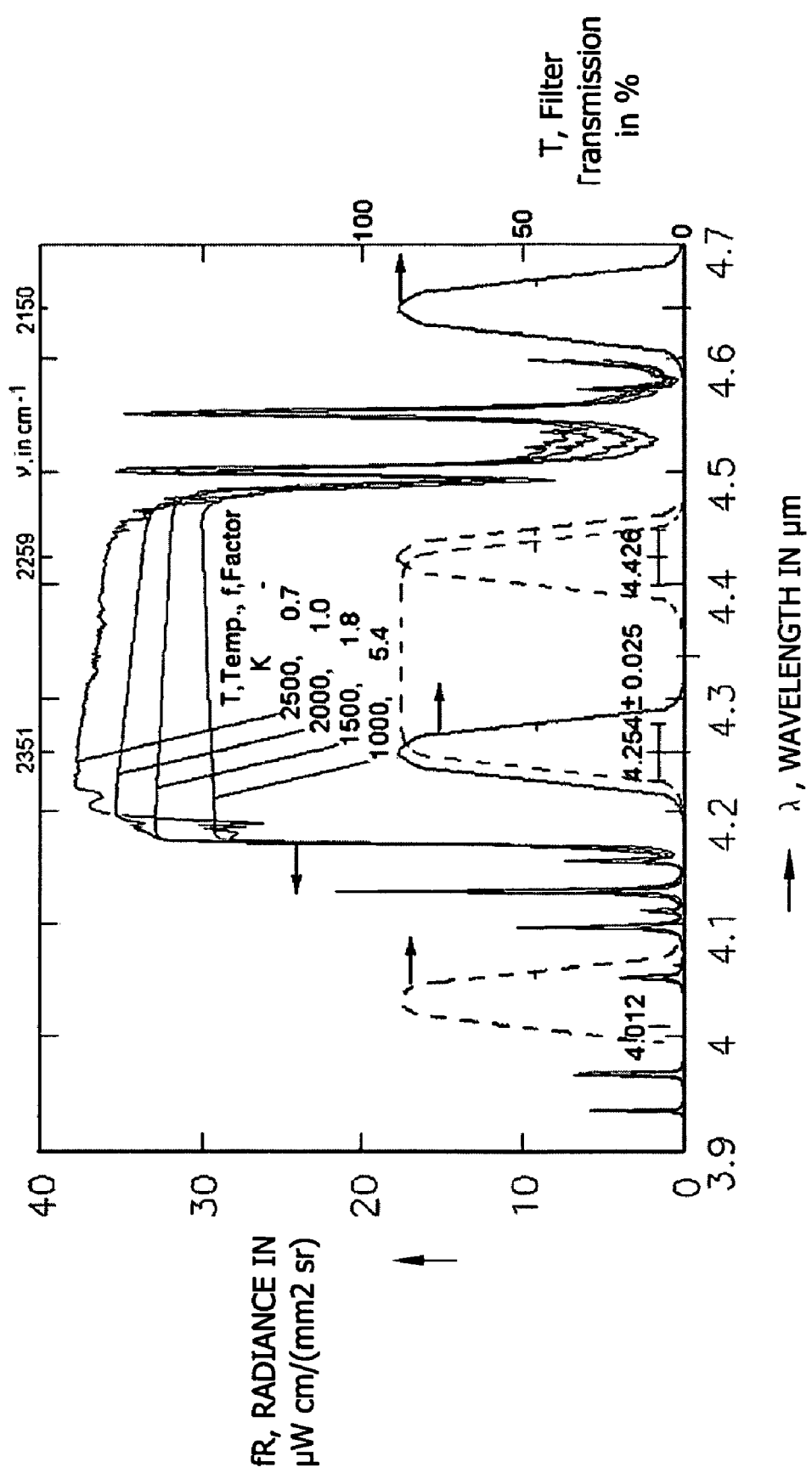
FIG. 4 shows the wavelength relationships of the three channel Fabry-Perot pyrometer.

FIG. 4 shows a graph of radiance, wavelength and transmission of three-channel pyrometer 20 based on Fabry-Perot wavelength modulation. Solid line "———" shows the thermal emission of combustion gases. Dashed line "- - - -" shows the wide band pass and blocking filter. Solid and dashed lines "═ ═ ═" also show the narrow band pass elements of the two FP comb filters, respectively. The combustion gases are shown at four temperatures, 20 bar and a 10 cm path length. The gas composition is $CO_2$, $H_2O$ and $N_2$ at 5, 5 and 90 mol %, respectively. For a wide blocking and band-pass filter 25 of width $\lambda_b - \lambda_a$, e.g., of 175 nm at $\lambda_o=4338$ nm±88 nm, the narrow band pass filters, $\Delta\lambda$ ($\leq \pm 25$ nm), may be provided by two Fabry-Perot (FP) comb filters 23 and 24 of about 400 nm tine spacing. The filter transmissions may be controlled in such a way that one filter 23 effectively shifts from its position to transmit to detector 21 at $\lambda_a = \lambda'_A = 4250$ nm to $\lambda'_A = 4138$ nm and $\lambda''_A = 4025$ nm, while simultaneously one shifts the next tine of its FP transmission peaks at $\lambda_B = 4650$ nm to $\lambda'_B = 4538$ nm and to $\lambda_b = \lambda''_B = 4425$ nm, respectively, while controlling the second FP filter 24, facing detector 22, to transmit the complementary wavelengths of 4425 nm, 4138 nm and 4250 nm, respectively. For this example, the finesse of the FP filter may be a non-demanding F=400/50=8, the spacing of the etalons (mirrors) may be $d=1/(2n \cdot \Delta\nu)=23.3$ micrometers (μm) and the maximum wavelength shift may be obtained by a change in d of $\delta d = d(\lambda_A - \lambda''_A)/\lambda_o = d(125/4325) = 0.67$ μm or 2.9 percent of d, the optical thickness of the FP etalon space. One may use an electro-optical material whose index could be modulated by 2.9 percent. Any other actuation 26 based on electrostatic, thermal, magnetic, pneumatic, rotation or piezoelectric to bring about such $\delta d$ displacement may be acceptable. A rotation of the FP etalon by $\phi=0.238$ radians or 13.6 degrees off normal incidence may also increase the wavelength by 2.9 percent from $\lambda_A$ to $\lambda''_A$. Aperture constraints might need to satisfy Fabry-Perot criteria to maintain the set finesse, the constraints becoming tighter as the $\phi$ increases.

The maximum allowable uncertainty, E, in each of the radiation sensor measurements, A, may depend on the desired maximum acceptable temperature uncertainty, $\Delta T$. The most challenging case may be at the highest temperature, $T_{max}$. For the illustrative example with two plus null channels at 4250 nm and 4425 nm, what the radiance ratio may be for black-body temperatures between 1000° and 2500° K as shown in the table of FIG. 20.

Given a relationship between the variables, A, T and $\rho$, $T=f(\rho)$ and $dT/dA=(df/d\rho) \cdot (d\rho/dA)$, one sees that the maximum uncertainty in A may need to stay below $E=\Delta A/A \leq (\Delta T/T)/\{(df/f)/(d\rho/\rho) \cdot (d\rho/\rho)/(dA/A)\} \sim (10/2000)/\{(1000/2000)/(0.03/1.04) \cdot 2^{0.5}\} \cdot 10^6 = \pm 220$ ppm or 1 part in 4545, in order to stay below an uncertainty, $\Delta T \leq \pm 10$K. This may be achieved with available detectors.

The 180° (or 360°) movement of the filters 14, 15 (FIG. 1) or detectors 11, 12 (FIG. 2) may be accomplished via stepper motor 16 as shown or via bowden-cable and return spring (with manual, magnetic, electrostatic or motorized actuation) or via in-situ magnetic actuators. In illustrative example 20 shown in FIG. 3, each of the Fabry-Perot comb filters 23, 24 in front of detectors 21, 22 may be designed such that 1) their "tine" spacing exceeds the width the one blocking filter and 2) their spectral modulation enables their narrow transmission band of ±25 nm (see FIG. 4) to switch (or scan) between the transmissions at 4250 and 4425 nm.

This switch may be accomplished in one of several ways, that is, by changing the optical thickness between the two etalon mirror surfaces mechanically (axial translation or rotation), piezoelectrically or thermally.

Figure 6A:
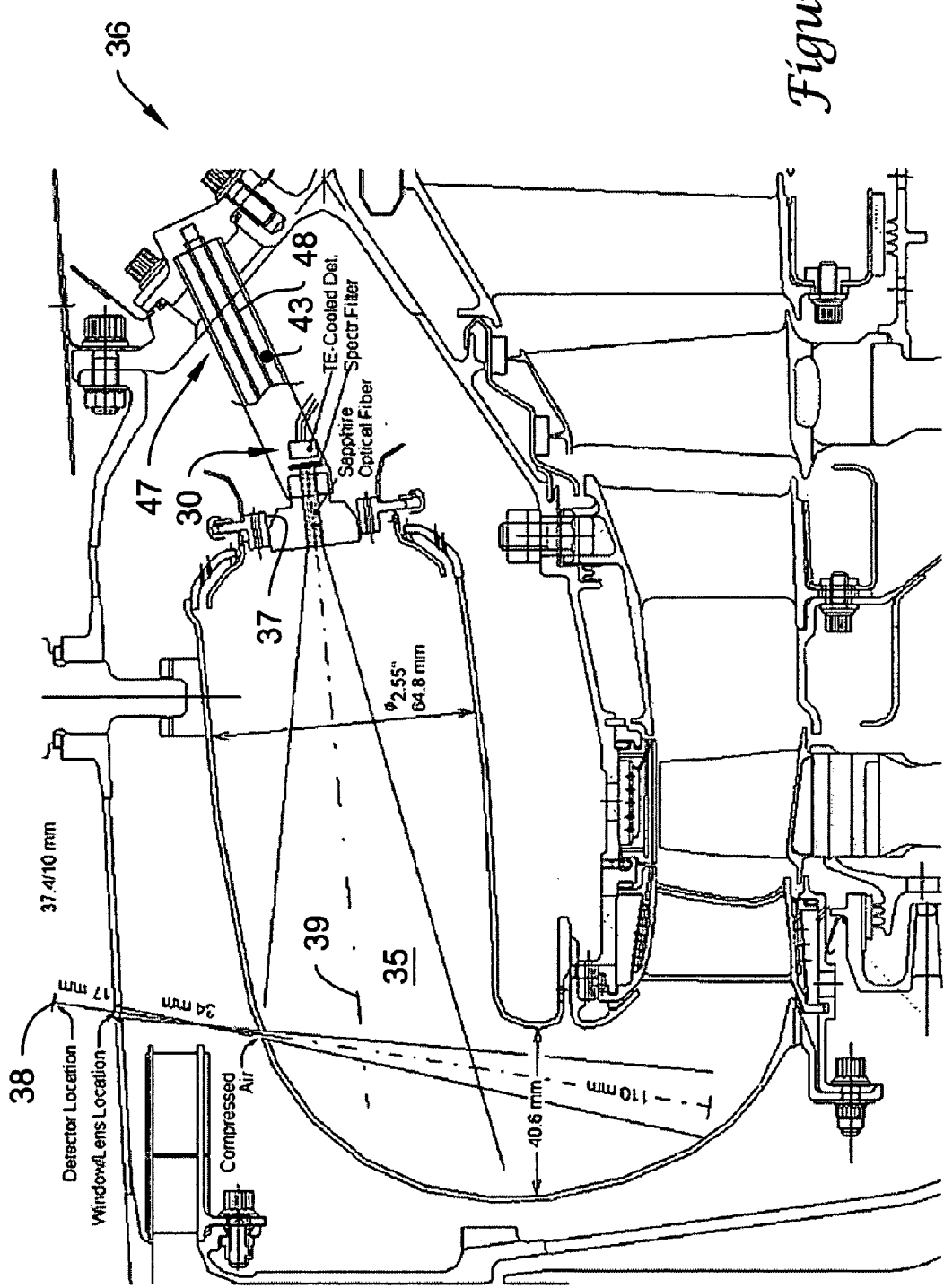
FIGS. 6a and 6b show several locations of a pyrometer situated in a gas combustor of a jet engine.
Figure 6B:
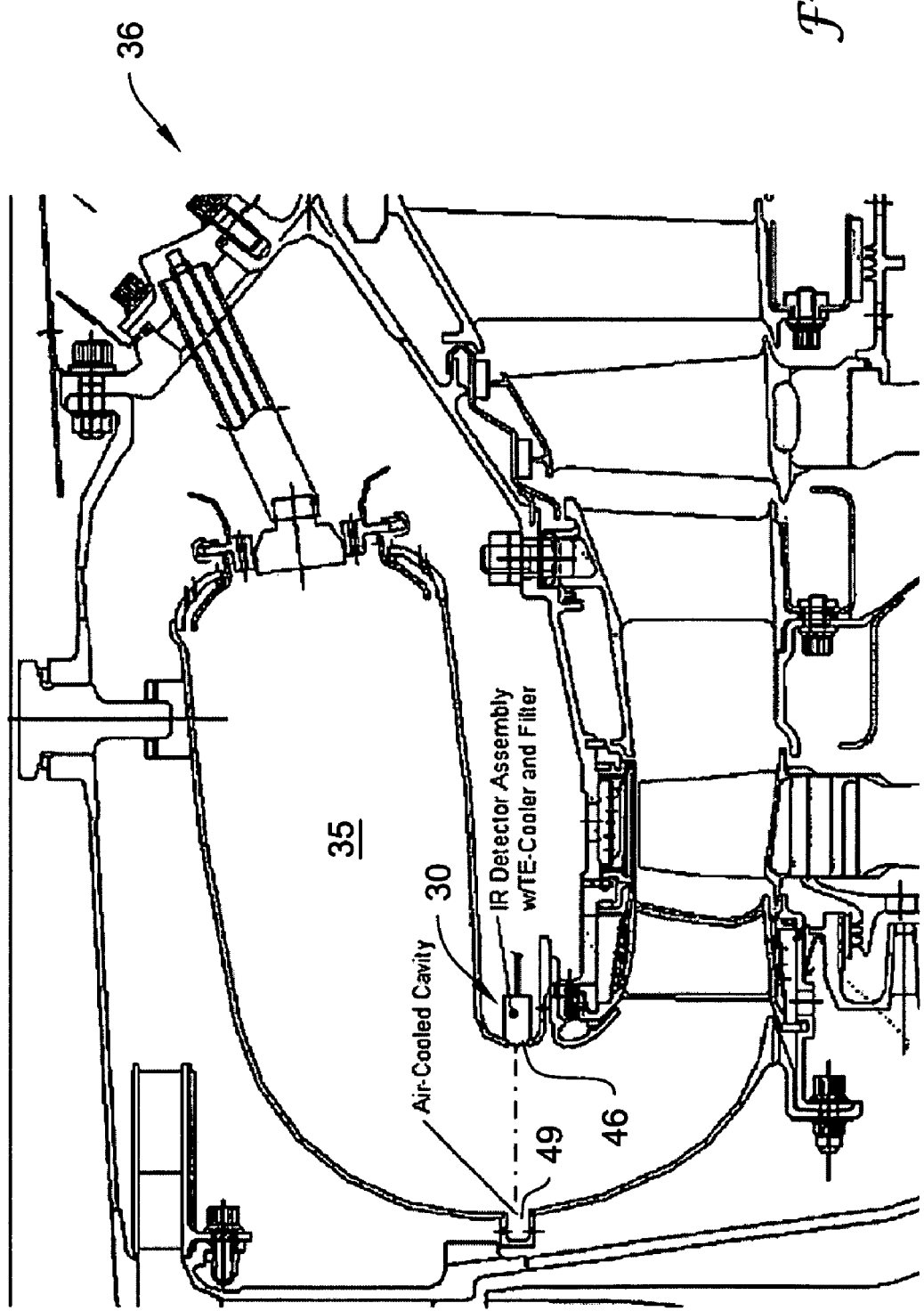

For a turbine combustor 36 application, one pyrometer location 37 may be as shown in FIG. 6a, which benefits from a long path 39>10 cm, detector 30 cooling from air 43 outside the compressor shell, purge compressed air (for purge and facilitating observation of exit gas), and access to actuator cable for the detectors. Another location 38 for the detector 30 may be as shown in FIG. 6a. Still another location 46 for detector system 30 may be as shown in FIG. 6b

Illustrative pyrometer 20 of FIG. 3 has several features. It may be a high-accuracy color temperature pyrometer, using a three-channel approach with two detectors 21, 22, with auto-compensation for changes in the sensitivity of the two detectors. It may have offset compensation via the third channel, measurement and compensation for non-zero thermal radiation of third channel and a relationship between the two-detector signal ratio and color temperature, indicated by using the geometric mean of two consecutive temperature signals (signal ratios, see eq. 1 above), and a mechanism to interchange two active ($T_A$ and $T_B$) and two passive ("null") filters 23, 24 in front of the two detectors 21, 22, respectively. This interchange may be accomplished via thermal actuation of a silicon etalon, from among mechanical and piezoelectric alternatives.

The auto-compensation may enable the pyrometer to operate in harsh, uncontrolled temperature environments, and have a long service life of moving parts by executing auto-compensation only when needed, e.g., after exceeding a set change in ambient temperature.

The high signal-to-noise, S/N, may be achieved by long observation times provided by slow or intermittently moving, automated filter-detector exchange, rather than limiting sense time to the short time-periods provided by a conventional filter-wheel.

The ability to measure average temperature of non-steady-state source may be enabled by simultaneous observation of the source via two channels with several implementation approaches (rather than sequential observation of the source as provided by filter wheel elements passing across one detector).

The pyrometer may use "uncooled" thermo-electric infrared (IR) arrays as detectors, whereby each may consist of an array of 5×5 elements or 20×20 elements with an active area of about 1.5×1.5 mm.

There are several advantages of the present pyrometers over related art ones. The advantages may include the ability to operate in a changing temperature environment (i.e., to compensate for changing sensitivity of each individual detector) with automatic rather than manual compensation of changes in view of unpredictable detector sensitivity The present pyrometers may operate in high ambient temperatures (up to about 200° C.) by using uncooled thermo-electric IR detectors, rather than Si, PbS, PbSe or GaAs devices which are limited to about 80° C. They may tolerate some soiling of the narrow band-pass filters (which affects their transmission loss by an equal factor), after initial calibration with a W-ribbon lamp, because only their ratio appears in equ. 1 above. The preceding noted features may reduce temperature output uncertainty.

The present pyrometers may permit one to observe and determine the average of non-steady source temperatures, by virtue of simultaneous measurement and averaging with two detectors, which may not be possible with one-detector pyrometers. A high S/N of the pyrometer may be achieved by optimizing the observation time, rather than being limited by the short time periods associated with traditional or not so traditional filter wheels. Spectral frequency modulation for the pyrometer channel detector exposure to two wavelengths "on" and one "off" positions may be provided by slow-moving stepper motor 16 (FIGS. 1, 2), or micro electromechanical system (MEMS) FP filter etalon (membrane) movement, piezoelectric twist movement or thermal excitation, each one having low-wear characteristics (FIG. 3).

A thermally tuned etalon may be used for band width switching of filters of light to detectors 21 and 22. Two filters 23, 24 may be utilized, one for each detector 21, 22, respectively. The etalon may be fabricated by a deep reactive ion etching (DRIE) of a 30 μm polysilicon membrane which is a part of a silicon-on-insulator (SOI) wafer. Measurements were taken after coating both sides with a quarter/quarter wave pair of Si/SiO2 films. These measurements showed thermal tuning. To get higher finesse, the wafers were coated with an additional pair of coatings on both sides. They were re-measured using a 1.5 μm telecom-like laser and a photodiode detector. This demonstrated thermal tuning over the full free spectral range of a silicon etalon by changing the temperature of the wafer including the silicon membrane and observing the central transmission band change by a full fringe.

Figure 7A:
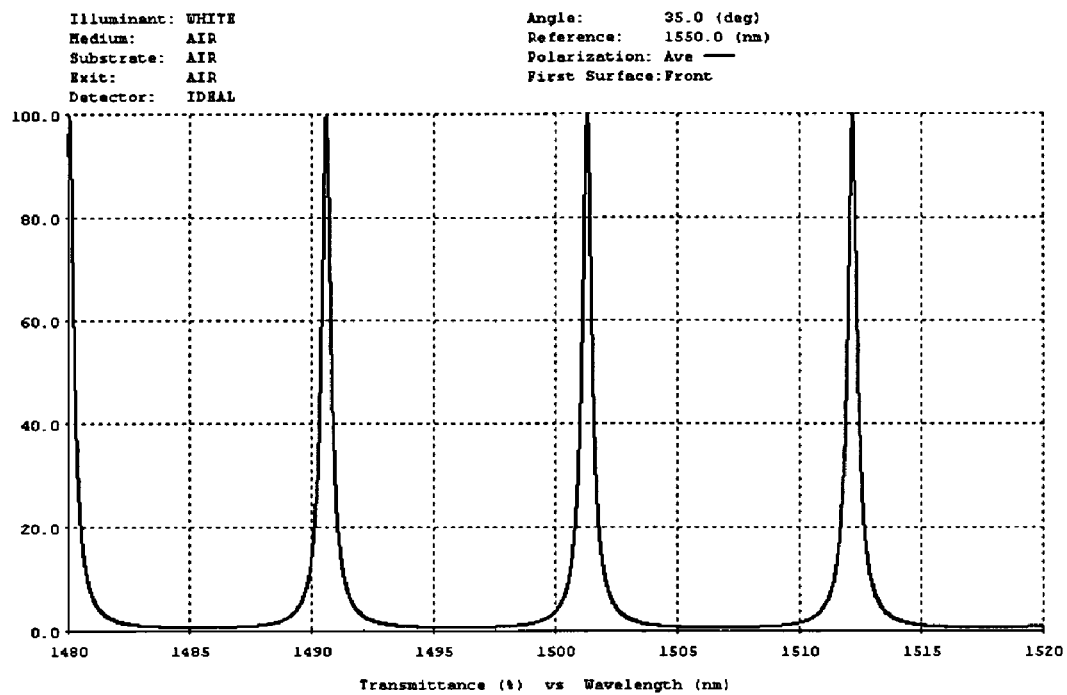
FIGS. 7a and 7b reveal transmittance properties of an illustrative example Fabry-Perot mirror at two different orientations.
Figure 7B:
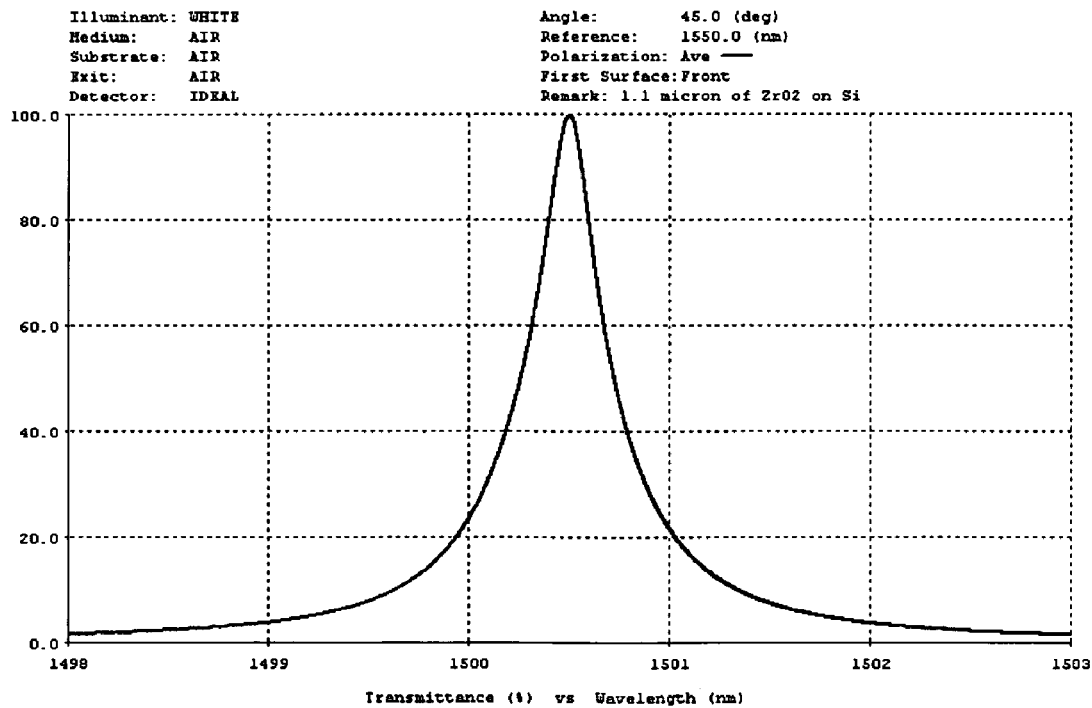
Figure 8:
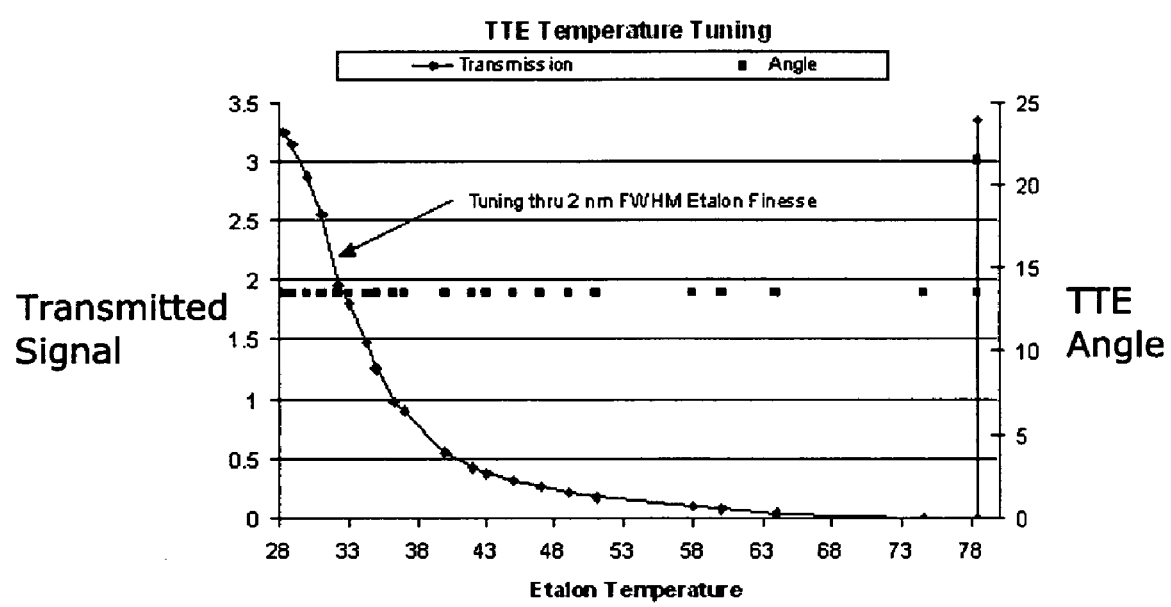
FIG. 8 shows a plot of a rotating etalon wafer recovering a transmission after a temperature change.
Figure 9:
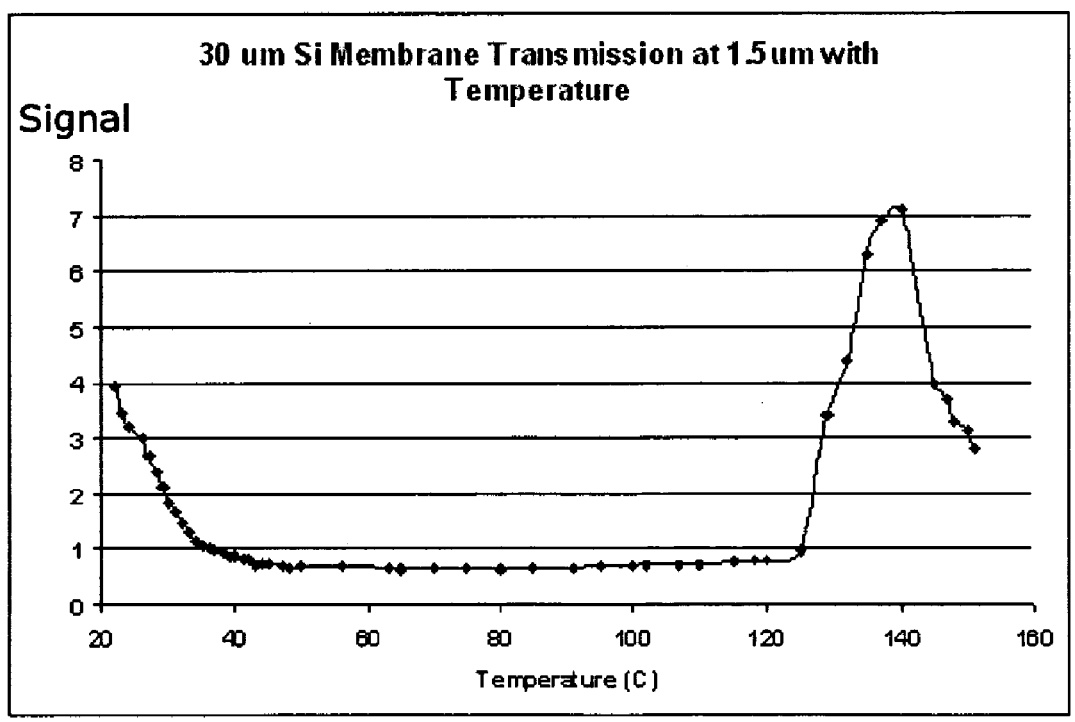
FIG. 9 shows a plot of an etalon wafer or membrane signal versus temperature.

FIG. 3 shows a device 20 and its setup. FIGS. 7a and 7b reveal calculated etalon properties for $Si/Si_3N_4/Si/Si_3N_4$ mirrors. These Figures show a graph of the calculated fringe pattern for this kind of mirror at 35 and 45 degrees, and a 30 μm etalon dimension that provides a 10 nm free spectral range with the current resolution of 0.5 nm. With this free spectral range and a dense wavelength division multiplexing (DWDM) band width of 0.25 nm, it may be possible to have 40 DWDM bands. To achieve tuning over the whole free spectral range by mirror rotation may require a rotation of the wafer by about 10 degrees. FIG. 8 shows the initial data with lower finesse etalon showing FWHM of about 14 degrees. At 78° C., the transmission peak at 28° C. was recovered by rotating the wafer from 13.5 degrees to 22 degrees. FIG. 9 reveals later data with a higher finesse etalon showing tuning and performance over the full free spectral range for one laser wavelength at 1.5 μm achieved with a 120° C. temperature change. The minimum appears better defined. The added mirror pairs were used and the quarter waves were done in separate runs. This demonstrated the fundamental characteristics of thermal tuning of a Fabry Perot cavity in silicon for potential DWDM applications.

An approach to sensing the gas temperature upstream of the stator blades over an adjustable gas space with one passive IR detector 30 for each atomizer may focus on the source of the overheating on each identified atomizer within a response time that is shorter than that of the blade temperature response, with minimal intrusion and high potential durability. A key feature may reside in the location and cooling for IR detector 30.

The need for and the possible benefits resulting from a successful CPF sensor 30 may be understood from the following scenario. Assuming that stator blades can withstand an operating temperature of 2500° F., the non-uniformity of the combustor exit gas temperatures may force that temperature to be set to no more than about 2300° F. (1533° K, i.e., a drop of over eight percent) and in order to prevent unpredictable "hot streaks" to stay below 3300° F. (2088° K). This forced drop in average temperature and the unpredictable occurrence of hot streaks may result in both turbine efficiency losses as well as excess $NO_x$ emissions, respectively. Due to unpredictable fuel injection nozzle coking and/or plugging of air inlets, one solution may be to measure the exit temperature of each combustor, so that appropriate, active fuel/air ratio control can be implemented.

The approach discussed below may be much more compact, accurate, rapid, rugged and affordable than other approaches in the related art. Detector 30 may be sized to be within a cylinder of ≦3"-long×1"-O.D., have no drift by virtue of the present wavelength modulation approach, feature higher S/N ratios because of the cooling with the fuel supply, generate output signal updates in milliseconds and cost much less than a spectrometer.

The challenges with the optical approach based on sensing the flame emission (optical output) at two or more spectral wavelengths may be several-fold. First is to identify suitable wavelength bands. Second is to cool detector 30 to achieve useful S/N (signal-to-noise) ratios. Third is to insure that the optical input represents the temperature of the gas rather then that of the hot background wall or refractory. Fourth is to set the spatial path for the source of emission into one wavelength band such that it is close to the spatial path for the second wavelength band needed to determine color temperature.

Figure 10:
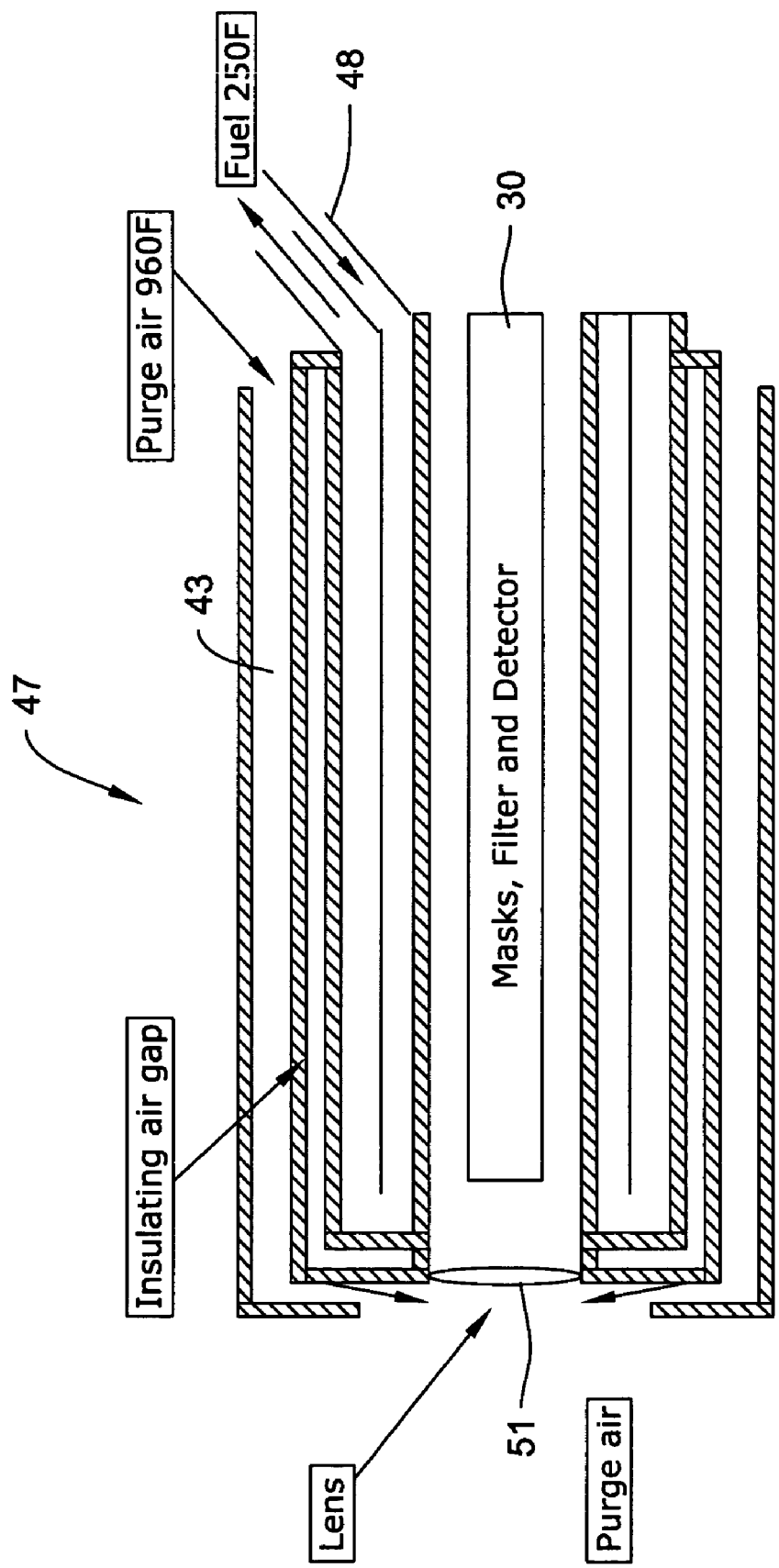
FIG. 10 shows an illustrative fuel cooling and air purging scheme for a pyrometer.

By way of an overview, FIG. 10 is a drawing that illustrates how cooling mechanism 47 may utilize the relatively cool liquid fuel 48 to cool detector 31 and its optical filter 32 of pyrometer 30 from the high flame temperatures in combustor 35 of a jet engine 36 in FIG. 6a, or like device. Cooling 47 scheme of FIGS. 7 and 10 tend to be different relative to that of FIG. 5 in terms of purge air 43 and cooling fuel 48.

FIG. 6b depicts the other location 46 of the detector 31 of system 30, and because the shorter optical path, it may require cooling of an area 49 with air of the combustor wall facing detector 31. Cooling of detector 31 with liquid fuel may require extra looping of the fuel line. However, the gas temperature measurement at this location may better represent the gas temperature impacting the first set of stator blades and the light received by detector 31 may not need to cross (and potentially be absorbed by) the area of concentrated fuel vapor and droplets from the injector nozzle. Cooling scheme 47 of FIG. 10 is designed to reduce the risk of coking the fuel 48 line.

Figure 11:
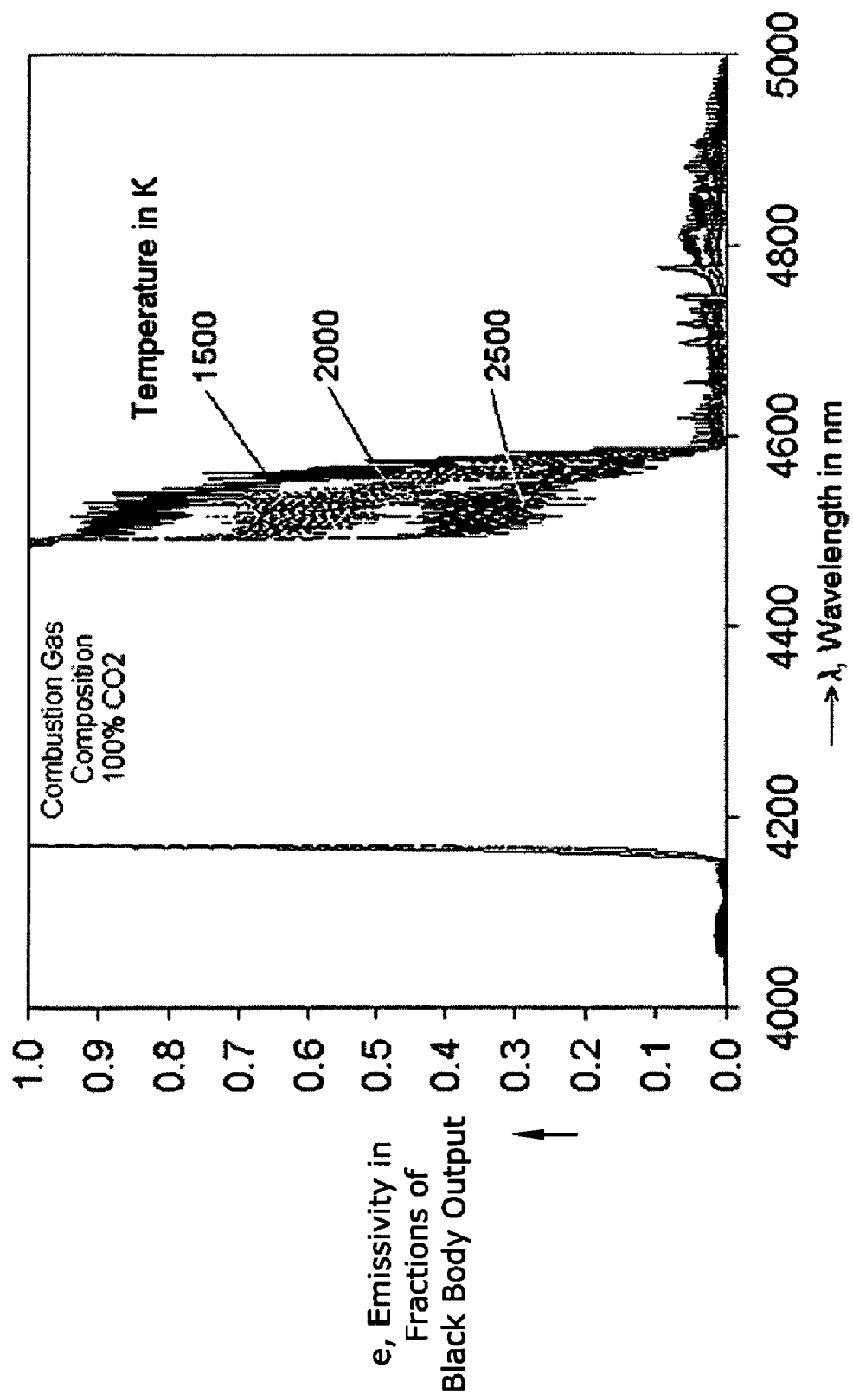
FIGS. 11–13 show various computed emission spectra of $CO_2$.
Figure 12:
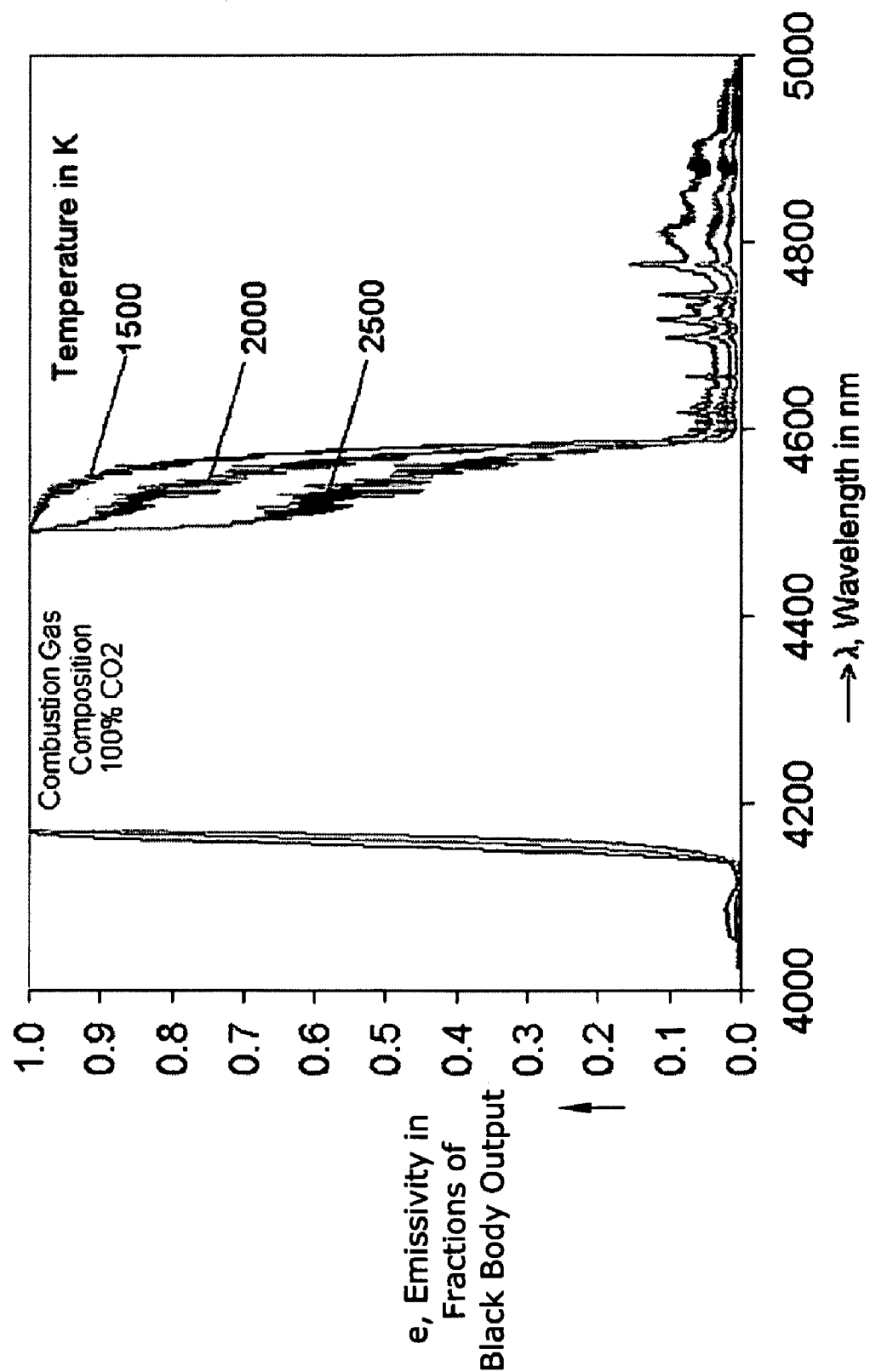
Figure 13:
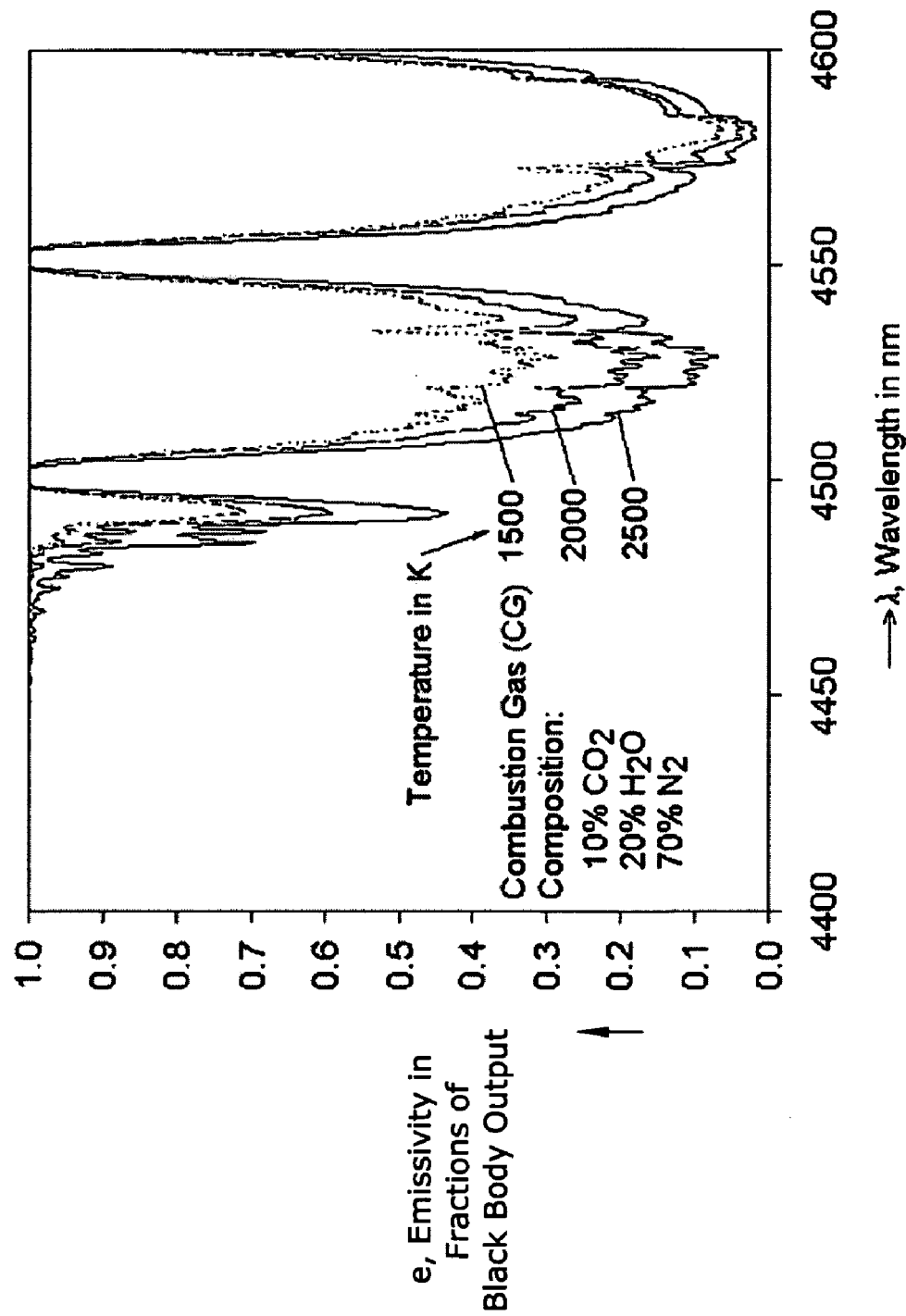

FIGS. 11–13 illustrate various computed emission spectra of $CO_2$, with and without $H_2O$, showing the emissivity changes versus temperature near 4538 nm, relative to its black-body-like radiation near 4300 nm, with a path length of only 10 cm.

Figure 14:
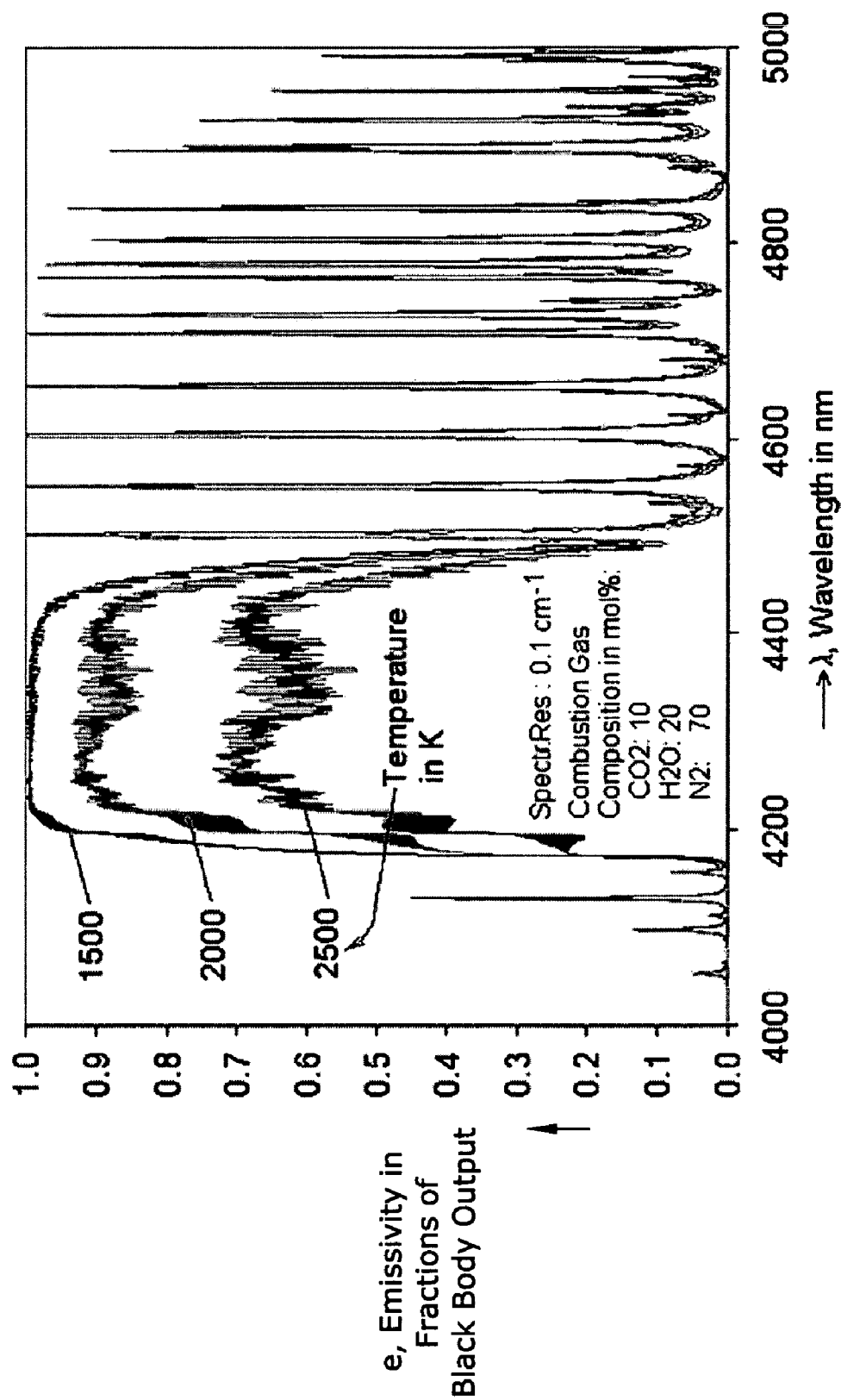
FIG. 14 shows a graph of emissivity spectra of $CO_2$ under various environmental conditions.

FIG. 14 shows emissivity spectra of $CO_2$ in a cell of 1 cm in length at 20 bar for 1500°, 2000° and 2500° K. It reveals that that 1 cm of optical path may not be enough to guarantee black body radiation from $CO_2$, and that an approximate representation of the emissivity (or absorption) may be represented by the expression: $\epsilon = 1-\exp\{-k \cdot x \cdot L \cdot p \cdot (2500/T)^{3.5}\}$ with an absorption coefficient of $k=0.6$ cm$^{-1}$ bar$^{-1}$ indicating that as temperature increases, emissivity decreases at a faster rate than would result from a simple density effect. To achieve "black" $CO_2$ radiation for x~10 mol %, T≦2500° K and 20 bar, one may need a path, L≧4 cm. For x≧5 mol %, the path may need to be L≧8 cm. For x≧5 mol %, p~20 bar and T≦1700° K (2600° F.) a path of L≧2 cm should be sufficient.

The nomenclature utilized here may include: D is light beam diameter in cm or mm; f is frequency in Hz; n is index of refraction (dimensionless); k is absorption coefficient in 1/(cm·bar); L is optical path length in cm; N is RMS noise level; S is RMS signal; P is total pressure in bar; $p_o$=reference pressure in 1 bar (=100,000 Pa); T is absolute temperature in ° K; the reference temperature is defined as $T_o$=293.15° K or 20° C.; x is mole fraction in dimensionless fractions; Δ is delta, difference or spacing, e.g., Δν=line spacing; emissivity is in dimensionless fractions; φ is off axis or collimation angle of light beam in degrees or radians; λ is wavelength in nm or μm; ν is wavenumber in cm$^{-1}$; and π is 3.14159.

Figure 15A:
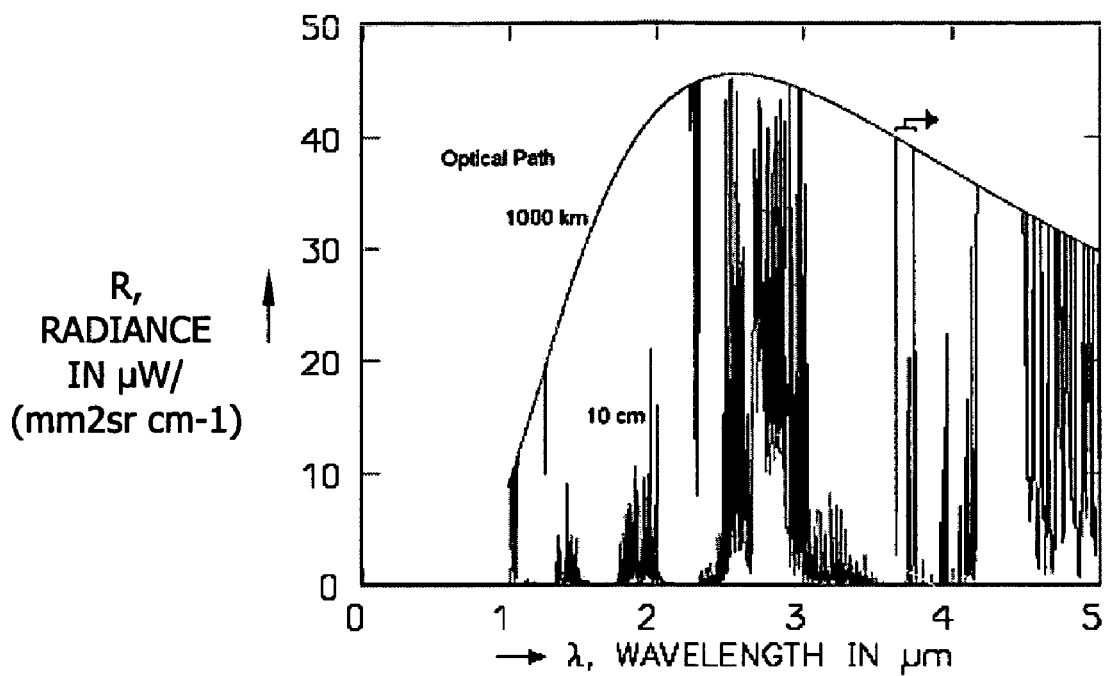
FIGS. 15a and 15b are plots of radiance of combustion gases at 2000° K.
Figure 15B:
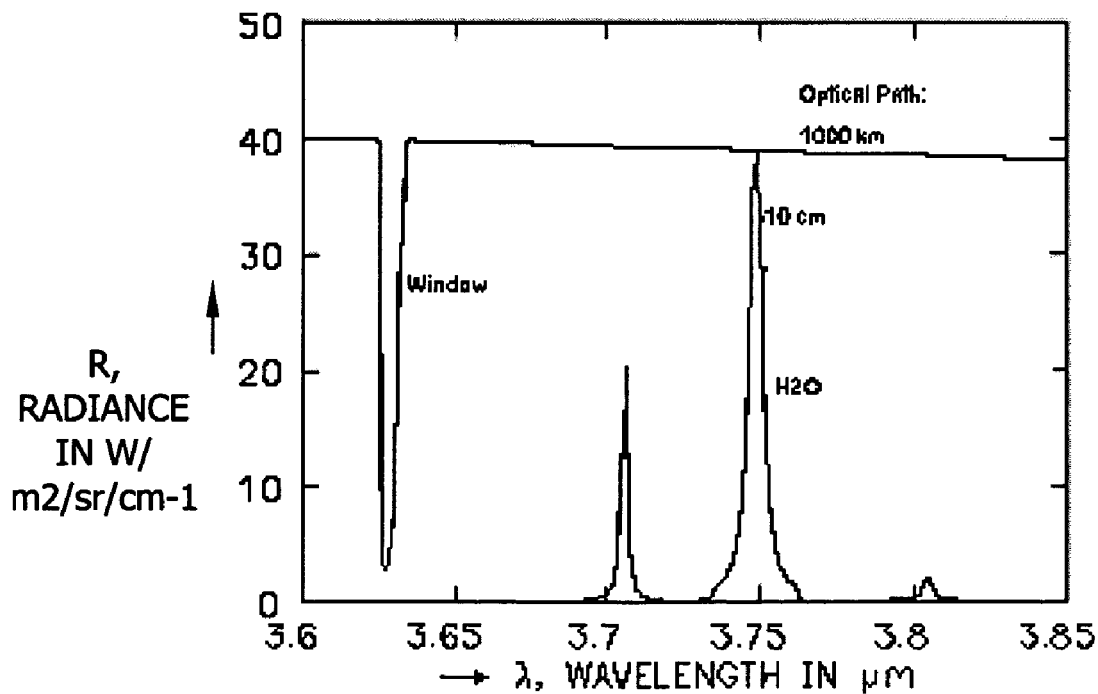

FIG. 15a shows the actual radiance over the 1–5 μm spectral range for optical paths of 10 cm and 1000 km of combustion gas composed of 10% $CO_2$, 10% $H_2O$ and 80% $N_2$ at 20 bar and 2000° K. One may derive the following insights from this plot, FIG. 15b, and similar ones. The 1000 km path may be long enough to closely follow the expected profile of a black-body radiator, except possibly at the atmospheric windows at 1.05, 1.24, 2.28 and 3.63 μm. The "black radiators" are the 4.3 μm $CO_2$ bands and a few narrow $H_2O$ lines between 2.9 and 3.0 μm and at 3.74 μm and therefore may be known as the preferred bands for flame pyrometers. The first harmonic of the $CO_2$ radiation with the Q-branch centered at 2.05 μm has an emissivity of 0.012 at 2000K, 20 bar and 10% CO2. The $H_2O$ band centered at 1.9 μm has an emissivity near 0.5 and masks the above first harmonic of $CO_2$. The $H_2O$ line at 3.748 μm has a half-width of 6.15 nm (about 4.37 cm−1 at 2667 cm−1) and is separated by about 121 nm from the atmospheric window at 3.628 μm, which also may have a half-width near 6 nm.

Figure 16A:
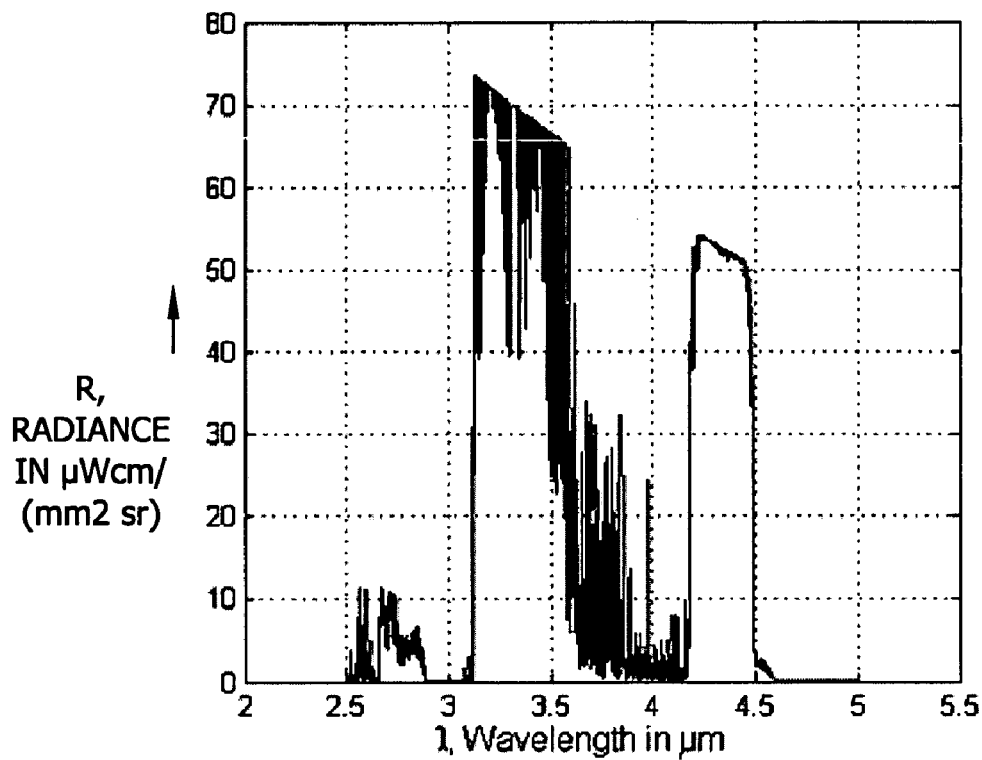
FIGS. 16a and 16b are plots of radiance of combustion gases at 2500° K.
Figure 16B:
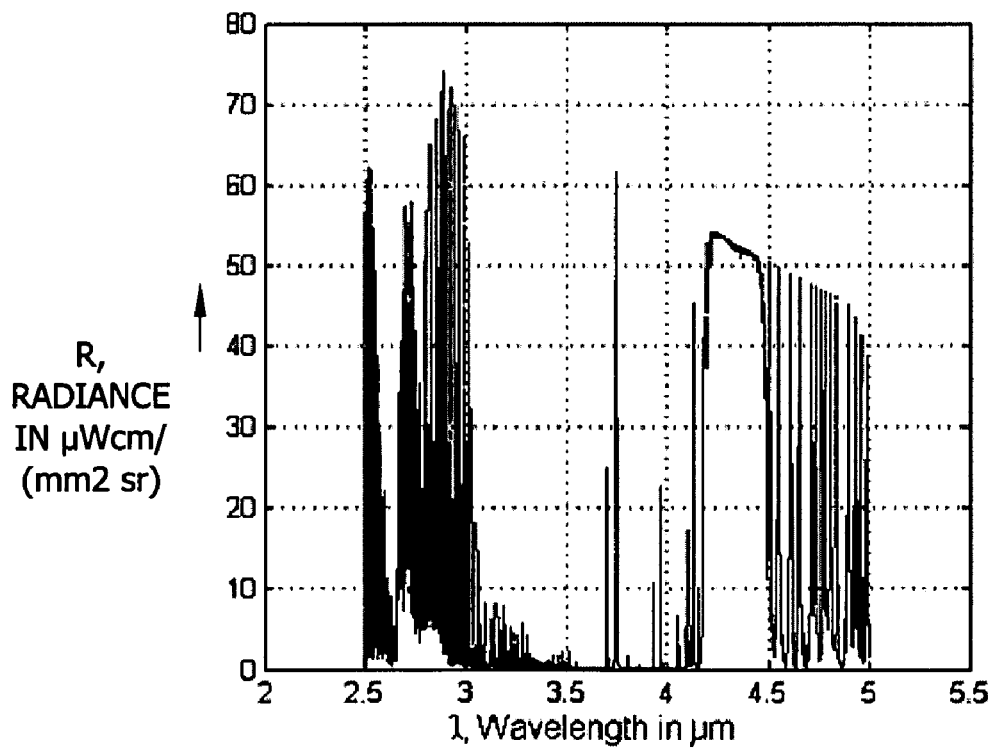

FIGS. 16a and 16b show the spectral variance of having 5 mol % methane versus 5 mol % water vapor as the radiance contributor to 5 mol % in nitrogen, in the 10 cm optical path. Both spectra may correspond to turbine combustion environments at 20 bar and 2500° K. The spectral absorption window at 3.628 μm may be masked by $CH_4$ (or any related —CH—) absorption, especially near the fuel injection nozzle.

Figure 17:
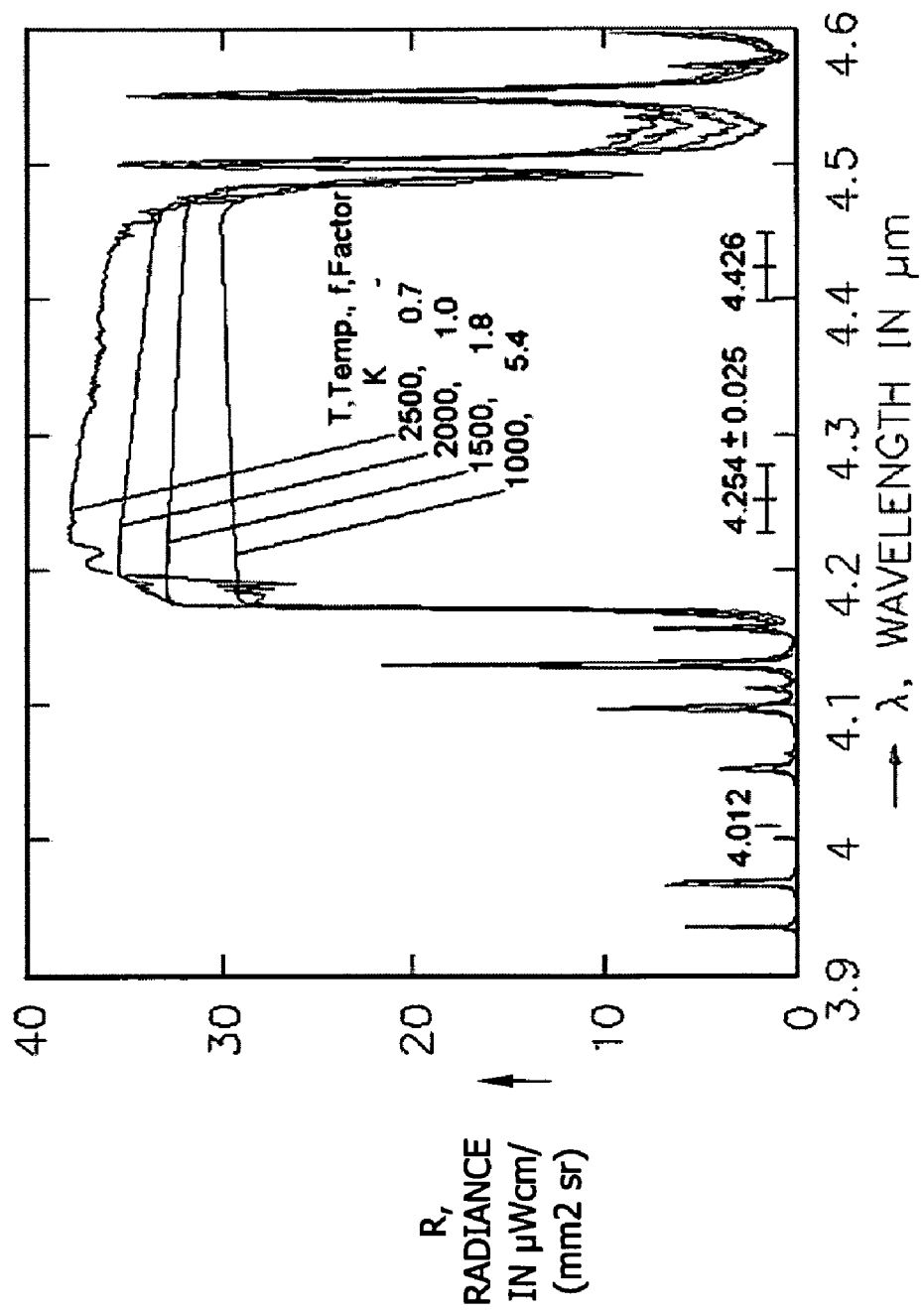
FIG. 17 is a series of comparative plots of radiance of combustion gases at various temperatures.

FIG. 17 shows plots of spectral radiance at 4 temperatures, indicating that for L≧10 cm, p≧20 bar, T≦2500K and x($CO_2$)≧5 mol %, the $CO_2$ emission within 4254≦λ≦4426 nm may be equivalent to that of a black-body radiator, and thus be used to determine gas temperature directly, either via single, absolute measurements (very difficult) or via measurements at two different wavelengths to determine color temperature via formation of radiance ratios (possibly a better approach).

FIG. 5 presents an illustrative example of a gas temperature sensor 30, in which the narrow opening 42 to the combustion chamber at left may be tilted so that purging air 43 does not interfere with the radiance measurement; fluid (e.g., fuel 48) flowing around the outer, insulated sheath, may be used for cooling; and lenses may be absent so that alignment may be facilitated and not affected by vibration. Several masks 45 may be placed along the beam of incoming light to remove stray light and any light outside of a ±1° aperture angle; and blocking filter 32 centered at 4012 nm may be tilted up to 42° to provide wavelength modulation to 4426 nm. An alternate and preferred actuation of blocking filter 32 tilt may be by an air turbine or motor 34 (not shown in FIG. 5), whereby filter 32 may be rotated at rates of 10 k to 80 k RPM and the IR detector 31 signal amplification may be synchronized with rotation. Gas temperature may be computed from the radiance ratio, ρ=R(4426)/R(4254). Provisions to "zero" the detector output may be provided by also monitoring the low radiance in the spectral window at 4.012 μm as the wavelength is dithered between or preferably scanned (via the above-noted rotation) through 4.012 and 4.426 μm, and beyond.

All solids emit thermal radiation according to Planck's Law from which their temperature may be derived from the radiation at one wavelength, if they have a known emissivity. If it is close to unity ($\epsilon$=1), they may be "black-body" radiators. If their emissivity is wavelength-independent but smaller than unity, they may be referred to as "gray body" radiators and their temperature may be derived with one measurement, as practiced with conventional optical pyrometers, provided that the value of $\epsilon$ is known at the wavelength of measurement.

The table in FIG. 18 below summarizes this situation in relation to the number of measurements needed to enable the derivation of actual temperature, T=$T_A$, brightness temperature, $T_B$ (i.e., temperature of a black body radiating with the same intensity at the wavelength of observation), and color temperature, $T_C$ (i.e., "color" of a black body appearing to have the same color, i.e., ratio of intensities at two chosen wavelengths, $\lambda_1$ and $\lambda_2$; if the emissivity is wavelength-independent (d$\epsilon$/d$\lambda$=0), then $T_C$=$T_A$. The last row appears to represent the least satisfactory case, in which neither $\epsilon$ nor d$\epsilon$/d$\lambda$ are known and only arbitrary brightness temperatures can be derived. With these, one might generically state that $T_A$ cannot be less than $T_B$, but $T_A$ can be larger or smaller than the derived "false" $T_C$.

In the subject at hand to determine the temperature of thermally radiating combustion gases, one may need to consider two more variables, that is, thermal equilibrium and gas concentration. First, one may consider thermal equilibrium. With solids, one might safely assume that their radiation reflects their temperature (except in special cases of fluorescence or chemiluminescence). With gases, especially reacting gases, this may be true less often. The blue-green appearance of $CH_4$-air flames may not be thermal radiation but chemiluminescence resulting from transitions between electronic molecular states energized by chemical (combustion) reactions. However, plain vibrational and rotational states may equilibrate very quickly especially at the elevated pressures (resulting in more collisions per unit time) present in turbine engine combustors Second, one may note gas concentration. There being no emitting "surface" in gases, their thermal emissivity, $\epsilon$, may be determined by the optical path length, L, the molecular concentration, x, of the species contributing to the radiation, and its partial (and total gas) pressure, besides absolute temperature. The computation of such gas emissivities based on all probable molecular transitions tends to be laborious.

Because of the known high concentrations and emissivities of $CO_2$ and $H_2O$ in combustion/combustor gases, one may focus on their thermal radiation to provide $T_A$, the desired and actual temperature, or at least radiation intensities that are related to temperature. The strongest, closest to black-body radiation, and easiest to monitor (near IR) thermal radiation of $CO_2$ may be at its band centered at 4300 nm in the near IR.

In the actual combustor, the gas temperature may rise to its maximum value after combustion is largely complete and most $CO_2$ and $H_2O$ have been generated. One therefore may expect low concentrations of $CO_2$ and $H_2O$ near the detector.

Below are some practical aspects of the proposed gas temperature sensor. First of all, the sensor performance requirements, as per analysis, may be noted here. First, the temperature measurement range may be from 1255 to 1854° K (1800 to 2877° F., or 982 to 1580° C.). Second, temperature sensing accuracy may be ±50° F. Third, angular selectivity may be ±5° (to inhibit cross sensitivity to adjacent burner flames). Fourth, response time may be about 0.5 second. Fifth, installation/ambient temperature may be about 149° C. (300° F.) Sixth, demonstrating structural integrity may require that the device needs to pass a vibration test Seventh, sensor cooling air used for all of the sensors may be ≦0.2 percent of total mass air flow at cruise, or 0.02 lbs/s or ≦0.42 g/s for each sensor.

Uncooled IR sensors for this application, in the form of TE (thermo-electric) sensor arrays, may be operated at over 150° C. Such sensors have been fabricated at Honeywell International Inc. in Minneapolis, Minn. A dedicated, 10-wafer run (10 mm O.D. wafers) might yield over 2000 chips of ~5×5 mm, each with an array of 31×31, i.e., about 1000, TE junctions. If the signal is high enough in this application, fewer elements may be needed, resulting in lower cost of each sensor. For example an array of 64 sensor elements of 0.005"×0.005" in size might fit into a 1×1 mm "sweet-spot" detector area.

In order to reliably and periodically "zero" the detector, one may modulate the wavelength that reaches the detector between on-band and off-band, as well as between the two wavelengths used to define the "color" temperature of the flame. In a simple embodiments, one may use the wavelengths of 4012 nm for "zero", and 50 nm-half-width bands centered at 4254 and 4426 nm as black-body radiation, provided for p≧20 bar, T≦2500° K, L≧10 cm and x ($CO2$)≧5 mol percent.

Figures 19A, 19B:
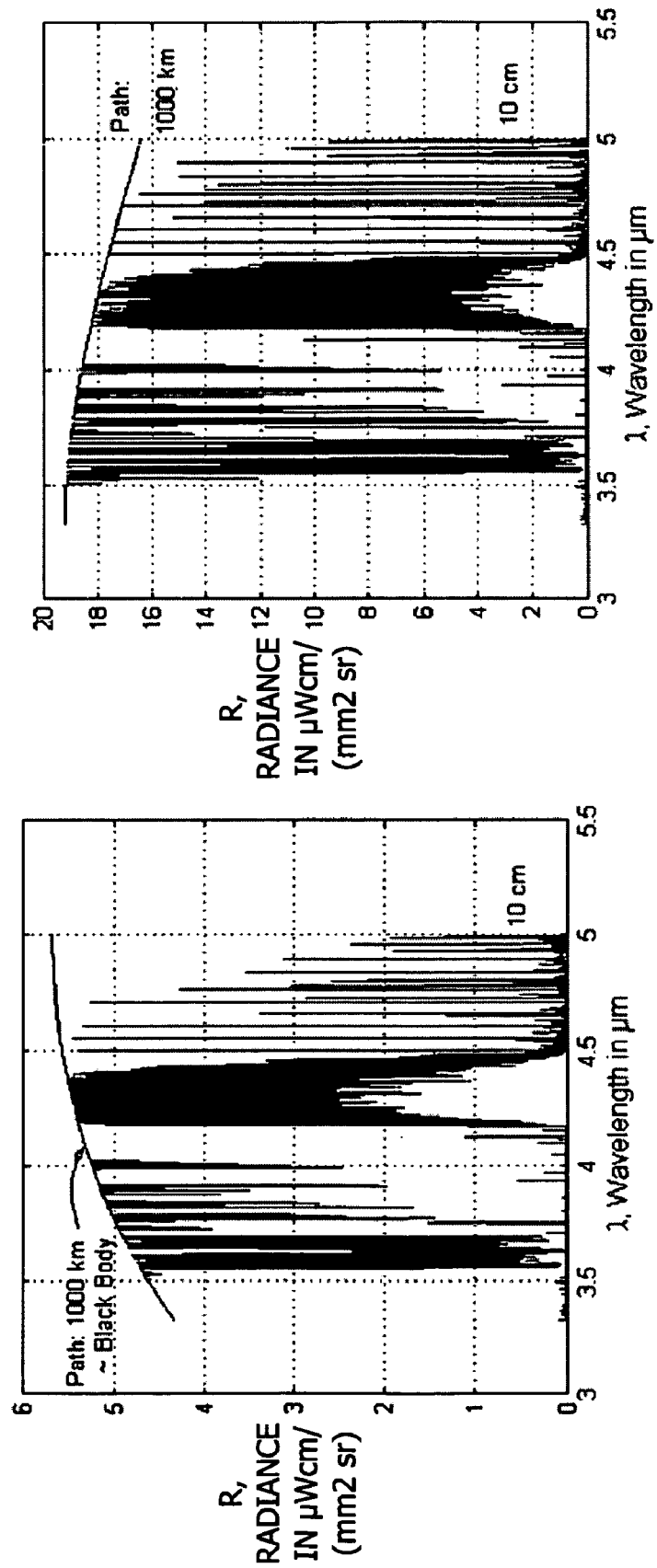
FIGS. 19a and 19b are plots of radiance of combustion gases at 1000° K and 1500° K, respectively.

A tilt dither of the angle on incidence, from normal incidence, A=0, to A=±42° may provide the needed wavelength modulation (see FIGS. 19a and 19b) because the increased path through the narrow-band interference filter may increase the effective filter layers to result in a shift to longer wavelengths by a fractional amount represented by 1/cos(B), where the refracted beam exit angle, B,=arc sin{sin(A)/n}. For A=42 (for a filter based on sapphire of index, n=1.6464, resulting in B=24°), the needed wavelength modulation of L3/L1=1/cos(B)=1.093 or 9.3% may be provided. Note that the wavelength center band pass may shift to longer wavelengths for both A=±42°.

In order to maintain the desired wavelength modulation of 9.3 percent, the detector aperture or viewing angle to the flame may need to be limited to ±1°, at least in the scanning plane, so that 9.03%≦1/cos(B)≦9.87% at A=±42°. One may achieve this by limiting the aperture to e.g., D≦2 mm I.D. for a detector-aperture distance of 60 mm, as depicted in FIG. 5. If the detector needs more light to increase S/N, one may open the aperture in the plane of the filter dither axis up to ±10° or ±10 mm without interfering with wavelength modulation.

Relative to the output signal, the line-by-line computed radiances plotted in FIG. 17 were evaluated and averaged with the suggested 50 nm-half-width filter, and yielded the data listed in FIG. 20.

The R-ratio change from 4254 to 4426 nm appears small, but this may be viewed in relation to the signal noise. To achieve a combustion gas temperature signal uncertainty, i.e., noise equivalent of 10° K, one may need an uncertainty in the R-ratio of 1.2%/500·10=0.024%, i.e., an S/N≧4200:1, which may be achievable. Non-linear regression between the above temperatures and R-ratios may yield an expression, T=747.59+417.58·$\rho^{28.88484}$ and E=±1631 ppm, where T=abs. temperature in ° K, $\rho$=radiance ratio and E=std. dev. of the fit in ppm (max. error or 2550 ppm). However, the log sensitivity of T to noise in $\rho$ is 21.1, i.e., an exemplary 100 ppm measurement uncertainty in $\rho$ may translate to an uncertainty in T of 21.1×100=2110 ppm, which for the worst case near 2500° K may be about 2110×$10^{-6}$×2500=5.2° K.

The low radiance (i.e., low absorption and high transmission) at 4012 nm may enable one to periodically check the temperature of the opposite, internal combustor wall; and when the detector faces the opaque edge the output may be viewed as a "zero" signal. The radiance at 4012 nm is only about 170 ppm of the radiance at the other two wavelengths.

The evaluation of the signal may be coupled to the timing of the filter wheel 32 rotational angle. The angle-wavelength relation may be, in turn, dependent of the effective refractive index of the films used to fabricate the narrow-band-pass filter. Assuming an effective index of n=1.6464 (sapphire), the values of rotation in degrees, radians and microseconds starting at normal incidence for 4012 nm, with a filter 32 rotation speed of 1 kHz (60,000 RPM) and further assuming the measurement time to be 1/10th of the 50 nm band-width scan time, one may get times of 0.875 and 0.636 microseconds for the bands at 4254 to 4426 nm, respectively, separated by a time of ~20 microseconds.

To cool the detector with the "cool" liquid fuel without adding to the risk of increasing the probability of coking the fuel (which is a tremendous problem for gas-turbine aero-applications) involves heat exchange considerations. There is often very little space around the fuel atomizer, and durability (i.e., preventing long-term plugging of the fuel line by coking) may need to be maintained. The temperature rise of jet fuel, $\Delta T_f$, (represented by dodecane) with a specific heat of $c_{p,f}$=402 cal/(K Liter) $|_{100° C.}$ resulting from cooling a $V_a$=1 L/min air stream of 1000° F. down to 275° F. ($\Delta T_a$=403° C.) may be roughly estimated for the worst condition of idling at about 2 gal/min (or $V_f$=0.126 L/min) as follows:

$$\Delta T_f \sim \Delta T_a (V_a/V_f)(c_{p,a}/c_{p,f})=$$
$$403 \cdot (1/0.126)(34/402)=270° C.$$

Such a rise in fuel temperature may exceed its coking temperature limit and be not acceptable.

One may review alternate approaches for solving the detector-cooling problem depending on location. One might leave the location of the detector inside the combustor plenum as indicated in FIG. 6a or 6b, i.e., to view the hot combustion gases directly, with or without a short (1–3") optical fiber "conduit". One may use compressed air after cooling it from 900–1000° F. with "bypass" air to its temperature, $T_b \leq 82.2°$ C. (180° F.) on the outside of the turbine plenum. This same air may also drive air motor 34 to rotate narrow band-pass filter 32 in FIG. 5, and to oppose the flow or diffusion of combustion gases into the optical channel and masks (thus effectively keeping the purge the optical system purged with air). The set-up of FIG. 10 may not need purge air other than to keep the window clean. With a $\Delta p$=1 psi pressure drop, 2 mm I.D.×4 mm O.D. steel tubing (able to hold 60,000 psi), a maximum length of 100 cm may pass over 9 L/min (4.5 L/min at 1000° F./w=361 µP) or 0.00033 lbs/s of air (5.64·10$^{-5}$ lbs/s at 1000° F.). The pressures may be about 4% higher than combustor pressures and range from 3 bar (45 psia at idle) to 8.6 bar (125 psia at cruise) to 21 bar (304 psia at full power).

Cool ambient air ($\leq$1 bar and $\leq$82° C. ($\leq$180° F.)) from the outside of the combustor plenum, may be used to cool the optical system (detector 31, filter 32, motor 34 and masks 45) indirectly, but without mass transfer to the much higher-pressure combustor gases. Here, the filter 32 may need to be driven via electric motor 34.

One may use $\leq$135° C. ($\leq$275° F.) fuel to cool a static detector chamber, without any air cooling, with electrical drive for the motor 34 to rotate filter 32 and use only regular compressed air at about 1000° F. to keep lens 51 clean, as depicted in FIG. 10.

One might move the location of detector(s) 31 away from hot combustor plenum 35, to a space in the "bypass air" channel, to view the hot combustion gases via optical fibers, which at worst may be 30 to 100 cm in length. Individually-mounted sensors 30 may be used with maximum optical fiber lengths of about 30 cm. A cluster-mount approach may be used whereby all optical fibers are brought to a common location. A common filter wheel 53 may be used for frequency modulation and isolation (i.e., chopping) of individual beams and one detector 30. The length of all optical (sapphire) fibers may be about 100 cm. Or a cluster-mount approach may be used whereby each sensor operates independently, with its own approximately 100 cm or so of fiber, electric filter 32 rotator and detector 31.

The generic merits and pitfalls of the above noted alternatives are indicated in the following. An optical fiber, window or lens at the combustor wall may save the plumbing of purge air through the optical system and enable its operation at ambient pressure; but it may become inaccurate if any soot or tar deposit on the optical surface facing the combustor generates significantly interfering black-body radiation. Air cooling by looping compressed air tubing through bypass air space may enable positioning of sensor at combustor wall, cooling detector, filter 32 and masks 45; driving air motor 34; and purging optical aperture; but may add 0.25" O.D. tubing mass and colder air to combustor. An electric motor 34 used to rotate optical filter 32 may save plumbing and uncertainties of designing a small air motor 34, but add electrical wires and moderate risk with the design of a small electric motor 34. Moving the location of the sensor to the bypass-air space may simplify the cooling problem, but may reduce performance to the extent that the added optical fiber length degrades the combustor gas emission signal. The cost of the longer optical fiber may be offset by the greater ease of installation. Incorporation of the temperature sensor into the fuel nozzle may reduce installation complexities, but might make nozzle design more complex and costly, and eliminate the flexibility to individually optimize the location/position of both nozzle and sensor There may be also detector options. A less sensitive and possibly slower, but more temperature-tolerant IR detector, such as a bolometer-type or "uncooled" IR detector, which is less sensitive to ambient temperature than PbSe or PbS, may be operated above 150° C. (302° F.), but is less sensitive and has relatively slow response time (0.05 to 10 ms).

The detector should be sufficiently sensitive to detect the available radiance. To determine whether the available radiance at 1000–2000° K (1340–3140° F.) can trigger a reasonable signal from an uncooled TE IR detector, it is estimated that the combustor output be at 1000° K (worst case). As shown in FIG. 17, the black-body output radiance at that temperature is about R=5.55 µW cm/(mm$^2$ sr). In one illustrative example, filter 32 has a half-width of 50 nm ($\Delta v$=27 cm$^{-1}$ at 4300 nm), the entrance aperture functions as the radiating area, A=2×2=4 mm$^2$, and the solid angle from there to the 1×1 mm detector is $\omega$=(1/60)$^2$, so that the input IR power near 4300 nm may be Q=R(4300)/($\Delta v$ A $\omega$)=5.55·10$^{-6}$/(27·4·$\omega$)=16.6 µW. The detector sensitivity (NEI or noise equivalent input for a 10×10 TE array) may be about 5.6·10$^{-4}$ µW/$\sqrt{Hz}$ for a 1 mm$^2$ detector, so that a S/N$\geq$30,000 for T$\geq$1000° K is possible for the right bandwidth, which should be compatible with the requirements mentioned in the above about output signal, even after allowing for transmission losses of about 2×. It had been determined to set an S/N requirement ≧4200:1.

Figure 21:
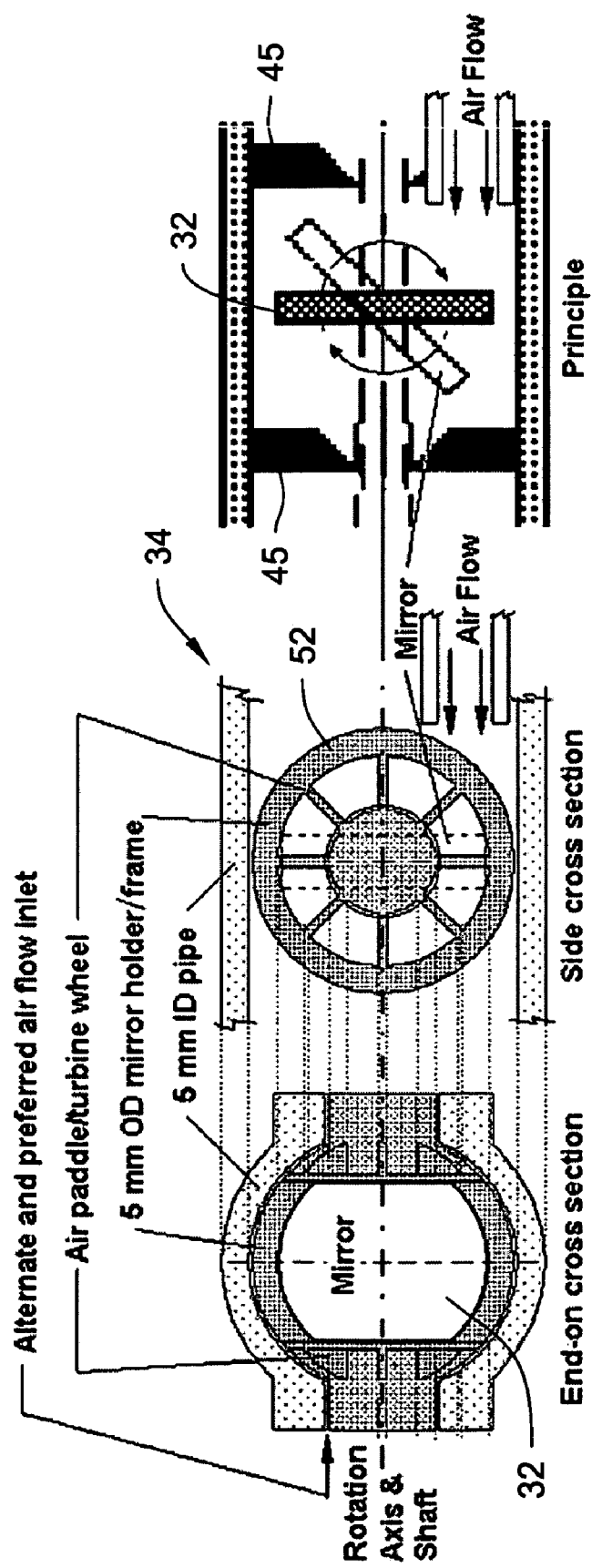
FIG. 21 shows several views of an example of an air motor and its relationship with the filter it rotates.

An air motor 34 may be used for a filter 32 drive as shown in FIG. 21. For a design of a high-speed drive for the rotating band-pass filter 32, components of an air-motor 34 on air-foil bearings may be used to achieve over 60,000 RPM (1000 Hz). An acceptable design in FIG. 21 may be composed of the following elements and perform as noted in the following. There may be two rotors 49 on either side of filter 32, of 4 mm O.D., each with two air channels of 0.2 mm I.D. (0.008"). At the desired rate of rotation of f=1000 Hz, the tangential speed of the rotor should be v=12.6 m/s, which may be exceeded by three to five times in the exiting air stream velocity. Under those conditions, the required air pressure drop should not exceed 1 bar, and the consumed mass flow of air should not exceed 1 lb/h (0.126 g/s).

FIGS. 21 and 22 show details of the filter mount and air-drive rotors 49, respectively. The above results were obtained with rotors 49 generating enough power to overcome viscous drag power of the air bearing and the rotating mirror 32 (assumed to be like the bearing).

One may compute kinetic air power, QA, and drag power, QD, corresponding to the device design shown in FIG. 22. These calculations may show that the drag power of the air bearing is smaller than the air power, i.e., for a speed about 1000 Hz. This may be the case despite the conservative assumption that the length of the rotor is the full axial length (10 mm) of the rotor, and not just the 2×2.5 mm of the bearing.

Features may include the use of high-speed wavelength modulation of black-body $CO_2$ radiance to an IR detector to determine its gas temperature, whereby the modulation may enable determination of $CO_2$ radiance ratio determination within the IR $CO_2$ band between 4.254 and 4.426 µm, zeroing the detector 31 output when filter 32 faces detector 31 with its opaque edge, as well as the determination of the opposite combustor wall temperature at 4.012 µm. Detector 31, filter 32 and the enclosure may be cooled to ≦275° F. via external circulation of "cool" fluid, whereby the cool fluid may be liquid fuel or cool air of low or high pressure. The modulation may be accomplished by an air turbine, driven by an air stream which also may be cooled by the fuel. Optics 51 may be kept clean via a purge-air stream, which may exit into the combustion chamber via an upward port or slit. The slit may be dimensioned to not allow aperture angles greater than about 1° to maintain the collimation of the light beam to the modulation filter. The temperature may be determined via a simple relation between it and said ratio of nulled outputs.

The advantages of this approach discussed above are that it may be much more compact, accurate, rapid, rugged and affordable. The device may be sized to be within a cylinder of ≦3"-long×1"-O.D., not drift by virtue of the wavelength modulation approach, feature higher S/N ratios because of the cooling with the fuel supply, generate output signal updates in milliseconds and cost much less than a spectrometer. One may use much higher modulation speeds (100–1000 Hz) than conventional IR systems (1–10 Hz), thus decreasing the 1/f noise and increasing S/N.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A pyrometer comprising:
   a first detector for sensing radiation from a source external to the pyrometer;
   a second detector for sensing radiation from the source external to the pyrometer;
   a first filter situated between the first detector and the source;
   a second filter situated between the second detector and the source; and
   a mechanism that can switch the first filter and second filter or replace the first filter or second with a filter from a plurality of filters; and
   wherein the radiation is sensed through the first and second filters by the first and second detectors at different wavelengths;
   the first and second detectors provide outputs to a processor; and
   the processor provides a measurement of a color temperarure of the source from a ratio of the outputs.

2. The pyrometer of claim 1, wherein the radiation source is approximately at one temperature during detection of the radiation by the first and second detectors that provide outputs.

3. The pyrometer of claim 2, wherein:
   the radiation is black emission of a gaseous emission; and
   a slope of the black emission is determined from the outputs of the first and second detectors.

4. A pyrometer comprising:
   a first detector for sensing an emission from a source external to the pyrometer;
   a second detector for sensing an emission from the source;
   a first filter situated between the first detector and the source; and
   a second filter situated between the second detector and the source; and
   wherein:
   the first filter is adjusted from one bandpass wavelength to another bandpass wavelength; and
   the second filter is adjusted from one bandpass wavelength to another bandpass wavelength.

5. The pyrometer of claim 4, further comprising:
   a third filter situated between the first and second detectors and the source; and
   wherein the third filter is adjustable between a broadband transmission and no transmission.

6. The pyrometer of claim 5, wherein:
   the first filter has an optical thickness;
   the second filter has an optical thickness;
   the third filter has an optical thickness;
   a change of optical thickness results in a change of a bandpass wavelength of the respective filter; and
   each of the first, second and third filters comprises an optical thickness-changing mechanism.

7. The pyrometer of claim 6, wherein the first and second filters alternate between first and second bandpass wavelengths.

8. The pyrometer of claim 7, wherein the third filter alternates between broadband bandpass and no bandpass.

9. The pyrometer of claim 8, wherein the first and second bandpass wavelengths define color temperature of the sensed radiation.

10. The pyrometer of claim 9, wherein each optical thickness-changing mechanism is a thermal actuation of the filters.

11. The pyrometer of claim 9, wherein each optical thickness-changing mechanism is a piezoelectric actuation upon the filters.

12. The pyrometer of claim 9, wherein each optical thickness-changing mechanism is an electrostatic actuation upon the filters.

13. The pyrometer of claim 9, wherein the first, second and third optical filters are Fabry-Perot filters.

14. The pyrometer of claim 9 further comprising a processor connected to the first, second and third detectors, and to the optical thickness-changing mechanisms.

15. The pyrometer of claim 14, wherein:
the processor controls the optical thickness-changing mechanisms; and
the processor indicates a temperature of the source.

16. The pyrometer of claim 15, wherein the pyrometer is for detecting a temperature of a gas combustor.

17. A pyrometer comprising:
a light detector for sensing radiation, from a source external to the pyrometer, along a first axis; and
a filter plate positioned between the detector and the source; and
wherein:
the filter plate is rotatable about a second axis;
the second axis is perpendicular to the first axis; and
upon each rotation, the filter plate becomes a first narrow bandpass filter between the detector and the source, a broad bandpass filter between the detector and the source, and a second narrow bandpass filter between the detector and the source.

18. The pyrometer of claim 17, wherein:
the detector, having the first narrow bandpass filter between the detector and the source, has a first output;
the detector, having the second narrow bandpass filter between the detector and the source, has a second output; and
the first and second outputs indicate a temperature of the source.

19. A pyrometer comprising:
a light detector for sensing radiation, from a source external to the pyrometer, along a first axis;
a filter plate positioned between the detector and the source; and
second light detector for sensing radiation from the source; and
wherein:
the filter plate is rotatable about a second axis;
the second axis is perpendicular to the first axis; and
the filter plate is further positioned between the second detector and the source.

20. The pyrometer of claim 19, wherein upon each rotation, the filter plate becomes a narrow bandpass filter between the second detector and the source, and a broad bandpass filter between the second detector and the source, alternatively.

21. The pyrometer of claim 19, wherein a first bandpass filter is inserted between the detector and the source, a second bandpass filter is inserted between the detector and the source, alternatively.

22. The pyrometer of claim 21, wherein upon each rotation of the filter plate, a third bandpass filter is inserted between the second detector and the source, and a fourth bandpass filter is inserted between the second detector and the source, alternatively.

23. The pyrometer of claim 22, wherein:
the first bandpass filter is equivalent to the fourth bandpass filter;
the second bandpass filter is equivalent to the third bandpass filter;
the first bandpass filter is between the detector and the source at the same time as the third bandpass filter is between the second detector and the source; and
the second bandpass filter is between the detector and the source at the same time as the fourth bandpass filter is between the second detector and the source.

24. The pyrometer of claim 23, wherein:
the detector has a first output;
the second detector has a second output;
the first, second, third and fourth filters limit the detectable wavelength band emitted by the source;
upon rotation of the filter plate, the first and second outputs are processed as a ratio; and
the ratio is processed to derive a temperature of the source.

25. A pyrometer comprising:
a first detector having a sensitivity $S_1$;
a second detector having a sensitivity $S_2$;
a first filter having a transmission $T_A$;
a second filter having a transmission $T_B$; and
wherein:
the first detector, having the first filter situated between the first detector and a source emanating radiation, has an output $A_1$;
the second detector, having the second filter situated between the second detector and the source, has an output $B_2$;
the first detector, having the second filter situated between the first detector and the source, has an output $B_1$;
the second detector, having the first filter situated between the second detector and the source, has an output $A_2$;
a first position comprises:
the first filter situated between the first detector and the source; and
the second filter situated between the second detector and the source;
a second filter position comprises:
the first filter situated between the second detector and the source; and
the second filter situated between the first detector and the source;
a first intensity $I_A$ of radiation from the source is proportional to outputs $A_1$ and $B_2$, for the first filter position;
a second intensity $I_B$ of radiation from the source is proportional to outputs $A_2$ and $B_1$, for the second filter position;

$$I_A = A_1/(T_A \cdot S_1); \text{ and}$$

$$I_B = B_2/(T_B \cdot S_2).$$

26. The pyrometer of claim 25, wherein:

$$I'_A = A'_2/(T_A \cdot S'_2);$$

$$I'_B = B'_1/(T_B \cdot S'_1);$$

a symbol with a prime indicates a measurement at a second time; and
a symbol with no prime indicates a measurement at a first time.

27. The pyrometer of claim 26, wherein:

$$I^+_A/I^+_B \sim \{(I_A/I_B)\cdot(I'_A/I'_B)\}^{0.5} = \{(A_1/B_2)\cdot(A'_2/B'_1)\}^{0.5}\cdot(T_B/T_A)\cdot\{(S'_1/S_1)\cdot(S_2/S'_2)\}^{0.5};$$

$$S_1 \sim S_2 \sim S'_1 S'_2 \sim 1; \text{ and}$$

$I^+_A$ and $I^+_B$ are the geometric means of two temperature sensor equivalents.

28. A pyrometer comprising:

a light detector for sensing radiation, from a source external to the pyrometer, along a first axis; and a filter plate positioned between the detector and the source; and wherein:

the filter plate is rotatable about a second axis;

the second axis is perpendicular to the first axis; and upon each rotation the filter plate becomes a narrow bandpass filter between the detector and the source, and a broad bandpass filter between the detector and the source, alternatively.

29. A pyrometer comprising:

a light detector for sensing radiation, from a source external to the pyrometer, along a first axis; and a filter plate positioned between the detector and the source; and wherein:

the filter plate is rotatable about a second axis;

the second axis is perpendicular to the first axis; and upon each rotation, the filter plate becomes a narrow bandpass filter between the detector and the source and a zero bandpass filter between the detector and the source.

* * * * *